US009137108B2

(12) United States Patent
Rezvani et al.

(10) Patent No.: US 9,137,108 B2
(45) Date of Patent: *Sep. 15, 2015

(54) SYSTEM FOR REMOTELY MONITORING DEVICE TO OBTAIN INFORMATION SENSED BY A DEVICE COMPONENT FEATURING CLIENT APPLICATION THAT DISPLAYS VIRTUAL COMPONENT CORRESPONDING TO SENSED INFORMATION AND REMOTE SITE FOR FACILITATING COMMUNICATION BETWEEN CLIENT APPLICATION AND DEVICE

(71) Applicant: Google Inc., Moutain View, CA (US)

(72) Inventors: Babak Rezvani, Saint Petersburg, FL (US); Edward B. Kalin, Easton, CT (US); Jack L. Chen, Princeton, NJ (US); Reza Jalili, Sandy, UT (US)

(73) Assignee: Google Inc., Mountain View, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 14/481,896

(22) Filed: Sep. 9, 2014

(65) Prior Publication Data
US 2015/0058406 A1 Feb. 26, 2015

Related U.S. Application Data

(63) Continuation of application No. 14/104,936, filed on Dec. 12, 2013, which is a continuation of application No. 12/853,140, filed on Sep. 8, 2010, now Pat. No. 8,723,664, which is a continuation of application No.

(Continued)

(51) Int. Cl.
G08B 1/00 (2006.01)
H04L 12/24 (2006.01)
(Continued)

(52) U.S. Cl.
CPC ............ *H04L 41/0813* (2013.01); *G06F 21/31* (2013.01); *G06Q 10/06* (2013.01);
(Continued)

(58) Field of Classification Search
CPC .......................... H04L 67/2823; H04L 68/329
USPC .................. 340/506, 505, 3.1, 539.1, 539.11, 340/539.13, 10.1; 705/80, 224
See application file for complete search history.

(56) References Cited

U.S. PATENT DOCUMENTS 3,626,098 A 12/1971 Lee
3,812,462 A 5/1974 Crossland et al.
(Continued)

FOREIGN PATENT DOCUMENTS

WO 9505627 2/1995
WO 9736247 10/1997
(Continued)

OTHER PUBLICATIONS

International Search Report mailed Dec. 14, 2001 for International Patent Application PCT/US2001/42061 filed Sep. 6, 2001, all pages.
(Continued)

*Primary Examiner* — Daryl Pope
(74) *Attorney, Agent, or Firm* — Kilpatrick Townsend & Stockton LLP

(57) ABSTRACT

Systems and methods for providing registration at a remote site that may include, for example, a monitoring module that may communicate with a remote site. A registration protocol may be used by the monitoring module and the remote site in generating the messages communicated during the registration process. The monitoring module may gather and generate various identification information to be included in the registration protocol messages. The registration information provided by the monitoring module maybe stored at the remote site in a database server having a database. A confirmation message may be communicated from the remote site to the monitoring module that may either acknowledge successful registration or report that an error occurred during the registration process.

20 Claims, 21 Drawing Sheets

Related U.S. Application Data

11/823,870, filed on Jun. 27, 2007, now Pat. No. 7,796,023, which is a continuation of application No. 11/143,920, filed on Jun. 1, 2005, now Pat. No. 7,250,854, which is a continuation of application No. 10/664,609, filed on Sep. 16, 2003, now Pat. No. 6,943,681, which is a continuation of application No. 09/709,688, filed on Nov. 10, 2000, now Pat. No. 6,686,838.

(60) Provisional application No. 60/230,318, filed on Sep. 6, 2000.

(51) Int. Cl.

| | |
|---|---|
| G06F 21/31 | (2013.01) |
| G06Q 10/06 | (2012.01) |
| G06Q 20/36 | (2012.01) |
| G06Q 50/18 | (2012.01) |
| H04L 12/28 | (2006.01) |
| H04L 29/06 | (2006.01) |
| H04L 29/12 | (2006.01) |
| H04L 12/26 | (2006.01) |
| H04W 60/00 | (2009.01) |
| H04L 29/08 | (2006.01) |
| G08C 17/02 | (2006.01) |
| H04M 1/725 | (2006.01) |
| H04W 24/00 | (2009.01) |
| H04W 28/04 | (2009.01) |

(52) U.S. Cl.
CPC .......... *G06Q20/3672* (2013.01); *G06Q 50/188* (2013.01); *G08C 17/02* (2013.01); *H04L 12/24* (2013.01); *H04L 12/2803* (2013.01); *H04L 12/2809* (2013.01); *H04L 12/2818* (2013.01); *H04L 12/2836* (2013.01); *H04L 29/06* (2013.01); *H04L 29/12113* (2013.01); *H04L 41/00* (2013.01); *H04L 43/0817* (2013.01); *H04L 43/50* (2013.01); *H04L 61/1541* (2013.01); *H04L 67/02* (2013.01); *H04L 67/025* (2013.01); *H04L 67/1095* (2013.01); *H04L 67/16* (2013.01); *H04L 67/42* (2013.01); *H04M 1/725* (2013.01); *H04W 60/00* (2013.01); *G08C 2201/20* (2013.01); *H04L 12/2807* (2013.01); *H04L 43/10* (2013.01); *H04L 67/2823* (2013.01); *H04L 69/329* (2013.01); *H04L 2012/285* (2013.01); *H04L 2012/2841* (2013.01); *H04L 2012/2845* (2013.01); *H04L 2012/2849* (2013.01); *H04W 24/00* (2013.01); *H04W 28/04* (2013.01)

(56) References Cited

U.S. PATENT DOCUMENTS

| | | | |
|---|---|---|---|
| 4,191,948 | A | 3/1980 | Stockdale |
| 4,258,421 | A | 3/1981 | Juhasz et al. |
| 4,524,243 | A | 6/1985 | Shapiro |
| 4,656,585 | A | 4/1987 | Stephenson |
| 4,959,713 | A | 9/1990 | Morotomi et al. |
| 4,977,612 | A | 12/1990 | Wilson |
| 4,990,890 | A | 2/1991 | Newby |
| 5,086,385 | A | 2/1992 | Launey et al. |
| 5,144,661 | A | 9/1992 | Shamosh et al. |
| 5,144,664 | A | 9/1992 | Esserman et al. |
| 5,195,126 | A | 3/1993 | Carrier et al. |
| 5,278,954 | A | 1/1994 | Hohlfeld et al. |
| 5,291,193 | A | 3/1994 | Isobe et al. |
| 5,335,277 | A * | 8/1994 | Harvey et al. ............... 380/242 |
| 5,400,246 | A | 3/1995 | Wilson et al. |
| 5,574,965 | A | 11/1996 | Welmer |
| 5,594,858 | A | 1/1997 | Blevins |
| 5,633,484 | A | 5/1997 | Zancho et al. |
| 5,673,252 | A | 9/1997 | Johnson et al. |
| 5,689,442 | A | 11/1997 | Swanson et al. |
| 5,754,765 | A | 5/1998 | Danneels et al. |
| 5,802,467 | A | 9/1998 | Salazar et al. |
| 5,805,055 | A | 9/1998 | Colizza |
| 5,812,394 | A | 9/1998 | Lewis et al. |
| 5,815,086 | A | 9/1998 | Ivie et al. |
| 5,817,993 | A | 10/1998 | Kamani et al. |
| 5,818,845 | A | 10/1998 | Moura et al. |
| 5,829,444 | A | 11/1998 | Ferre et al. |
| 5,835,094 | A | 11/1998 | Ermel et al. |
| 5,857,152 | A | 1/1999 | Everett |
| 5,859,852 | A | 1/1999 | Moura et al. |
| 5,872,928 | A | 2/1999 | Lewis et al. |
| 5,875,323 | A | 2/1999 | Machida |
| 5,887,254 | A | 3/1999 | Halonen |
| 5,898,386 | A | 4/1999 | Kaihatsu |
| 5,917,405 | A | 6/1999 | Joao |
| 5,963,624 | A | 10/1999 | Pope |
| 5,986,654 | A | 11/1999 | Alexander et al. |
| 5,999,812 | A | 12/1999 | Himsworth |
| 6,002,427 | A | 12/1999 | Kipust |
| 6,005,476 | A | 12/1999 | Valiulis |
| 6,005,482 | A | 12/1999 | Moran et al. |
| 6,005,613 | A | 12/1999 | Endsley et al. |
| 6,006,039 | A | 12/1999 | Steinberg et al. |
| 6,009,401 | A | 12/1999 | Horstmann |
| 6,012,084 | A | 1/2000 | Fielding et al. |
| 6,020,881 | A | 2/2000 | Naughton et al. |
| 6,023,223 | A | 2/2000 | Baxter, Jr. |
| 6,032,202 | A | 2/2000 | Lea et al. |
| 6,035,323 | A | 3/2000 | Narayen et al. |
| 6,035,423 | A | 3/2000 | Hodges et al. |
| 6,060,994 | A | 5/2000 | Chen |
| 6,061,738 | A | 5/2000 | Osaku et al. |
| 6,069,655 | A | 5/2000 | Seeley et al. |
| 6,091,413 | A | 7/2000 | Takeuchi et al. |
| 6,098,116 | A | 8/2000 | Nixon et al. |
| 6,134,606 | A | 10/2000 | Anderson et al. |
| 6,147,601 | A | 11/2000 | Sandelman et al. |
| 6,163,316 | A | 12/2000 | Killian |
| 6,166,729 | A | 12/2000 | Acosta et al. |
| 6,182,094 | B1 | 1/2001 | Humpleman et al. |
| 6,198,408 | B1 | 3/2001 | Cohen |
| 6,202,210 | B1 | 3/2001 | Ludtke |
| 6,212,556 | B1 | 4/2001 | Arunachalam |
| 6,218,953 | B1 | 4/2001 | Petite |
| 6,219,702 | B1 | 4/2001 | Ikehara et al. |
| 6,233,428 | B1 | 5/2001 | Fryer |
| 6,236,332 | B1 | 5/2001 | Conkright et al. |
| 6,236,997 | B1 | 5/2001 | Bodamer et al. |
| 6,237,049 | B1 | 5/2001 | Ludtke |
| 6,243,000 | B1 | 6/2001 | Tsui |
| 6,275,490 | B1 | 8/2001 | Mattaway et al. |
| 6,275,939 | B1 | 8/2001 | Garrison |
| 6,286,038 | B1 | 9/2001 | Reichmeyer et al. |
| 6,288,716 | B1 | 9/2001 | Humpleman et al. |
| 6,292,830 | B1 | 9/2001 | Taylor et al. |
| 6,298,332 | B1 | 10/2001 | Montague |
| 6,311,197 | B2 | 10/2001 | Mighdoll et al. |
| 6,330,597 | B2 | 12/2001 | Collin et al. |
| 6,366,217 | B1 | 4/2002 | Cunningham et al. |
| 6,366,296 | B1 | 4/2002 | Boreczky et al. |
| 6,385,772 | B1 | 5/2002 | Courtney |
| 6,388,579 | B1 | 5/2002 | Adcox et al. |
| 6,411,724 | B1 | 6/2002 | Vaithilingam et al. |
| 6,437,692 | B1 | 8/2002 | Petite et al. |
| 6,469,714 | B2 | 10/2002 | Buxton et al. |
| 6,522,342 | B1 | 2/2003 | Gagnon et al. |
| 6,535,228 | B1 | 3/2003 | Bandaru et al. |
| 6,564,380 | B1 | 5/2003 | Murphy |
| 6,578,025 | B1 | 6/2003 | Pollack et al. |
| 6,584,466 | B1 | 6/2003 | Serbinis et al. |
| 6,591,279 | B1 | 7/2003 | Emens et al. |
| 6,603,488 | B2 | 8/2003 | Humpleman et al. |
| 6,606,117 | B1 | 8/2003 | Windle |
| 6,636,259 | B1 | 10/2003 | Anderson et al. |
| 6,654,782 | B1 | 11/2003 | O'Brien et al. |

(56) References Cited

U.S. PATENT DOCUMENTS

| | | |
|---|---|---|
| 6,680,730 B1 | 1/2004 | Shields et al. |
| 6,686,838 B1 * | 2/2004 | Rezvani et al. .............. 340/506 |
| 6,698,021 B1 | 2/2004 | Amini et al. |
| 6,710,790 B1 | 3/2004 | Fagioli |
| 6,715,003 B1 | 3/2004 | Safai |
| 6,803,945 B1 | 10/2004 | Needham |
| 6,907,387 B1 | 6/2005 | Reardon |
| 6,930,709 B1 | 8/2005 | Creamer et al. |
| 6,943,681 B2 * | 9/2005 | Rezvani et al. .............. 340/506 |
| 6,954,859 B1 | 10/2005 | Simerly et al. |
| 7,010,144 B1 | 3/2006 | Davis et al. |
| 7,117,519 B1 | 10/2006 | Anderson et al. |
| 7,209,955 B1 | 4/2007 | Major et al. |
| 7,231,592 B2 | 6/2007 | Humpleman et al. |
| 7,250,854 B2 * | 7/2007 | Rezvani et al. .............. 340/506 |
| 7,272,845 B2 | 9/2007 | Creamer et al. |
| 7,287,088 B1 | 10/2007 | Anderson |
| 7,783,252 B1 * | 8/2010 | Harvey et al. ................ 455/39 |
| 7,796,023 B2 * | 9/2010 | Rezvani et al. .............. 340/506 |
| 8,723,664 B2 * | 5/2014 | Rezvani et al. .............. 340/506 |
| 2001/0032151 A1 | 10/2001 | Paul et al. |
| 2001/0049671 A1 | 12/2001 | Joerg |
| 2002/0058499 A1 | 5/2002 | Ortiz |
| 2002/0169914 A1 | 11/2002 | Shteyn |
| 2003/0234809 A1 | 12/2003 | Parker et al. |
| 2004/0109061 A1 | 6/2004 | Walker et al. |
| 2004/0150546 A1 | 8/2004 | Choi |
| 2005/0007454 A1 | 1/2005 | Needham |

FOREIGN PATENT DOCUMENTS

| | | |
|---|---|---|
| WO | 9827679 | 6/1998 |
| WO | 9853397 | 11/1998 |
| WO | 0039993 | 7/2000 |
| WO | 0075900 | 12/2000 |
| WO | 02/21414 | 3/2002 |

OTHER PUBLICATIONS

International Report on Patentability completed Jun. 24, 2003 for International Patent Application PCT/US2001/42061 filed Sep. 6, 2001, all pages.

* cited by examiner

FIG. 5

SIGN-UP SERVICE AGREEMENT

| 1 | 2 | 3 | 4 | 5 | 6 | 7 |

SIGN-UP

SERVICE AGREEMENT ( I AGREE )    ( I DISAGREE )

THIS SERVICES AGREEMENT ("AGREEMENT") IS BETWEEN YOU ("USER") AND CORE TECHNOLOGY, INC. ("COMPANY"), IN CONSIDERATION OF THE RIGHT TO ACCESS AND USE THE COMPANY'S WEBSITE, HTTP://WWW.XANBOO.COM ("WEBSITE"), AND RECEIVE SERVICES OFFERED THROUGH THE WEBSITE (THE "SERVICES"), USER AGREES TO THE TERMS AND CONDITIONS OF USE SET FORTH IN THIS AGREEMENT AND ACKNOWLEDGES THAT HE SHE IS AT LEAST 18 YEARS OF AGE. USER'S CONTINUED USE OF THE SERVICES INDICATES USER'S WILLINGNESS TO BE LEGALLY BOUND BY THE TERMS AND CONDITIONS OF THIS AGREEMENT AS SET FORTH BELOW. THIS AGREEMENT APPLIES TO THE SERVICES CURRENTLY OFFERED BY COMPANY AND ANY SERVICES THAT THE COMPANY MAY CHOOSE TO OFFER IN THE FUTURE (UNLESS STATED OTHERWISE).

1. CONVENANT TO READ AGREEMENT.
USER ACKNOWLEDGES THAT USER HAS READ THIS AGREEMENT AND ACCEPTS THE TERMS THEREOF. IF USER DOES NOT AGREE TO THESE TERMS AND CONDITION, USER MAY NOT ACCESS OR OTHERWISE USE THE WEBSITE OR THE SERVICES.

2. COMPANY'S CONTROL OVER WEBSITE.
(A) COMPANY HAS THE RIGHT, BUT NOT THE OBLIGATION, TO MONITOR THE USE OF THE WEBSITE AND THE SERVICES, AND, EXCEPT AS OTHERWISE PROVIDED UNDER COMPANY'S PRIVACY POLICY, MAY FREELY USE AND DISCLOSE ANY INFORMATION AND MATERIALS RECEIVED FROM THE USER OR COLLECTED THROUGH USER'S USE OF THE WEBSITE FOR ANY LAWFUL REASON OR PURPOSE. CLICK HERE TO VIEW COMPANY'S PRIVACY POLICY. WITHOUT LIMITING THE FOREGOING, COMPANY HAS THE RIGHT TO REMOVE ANY MATERIAL THAT COMPANY, IN ITS SOLE DISCRETION, FINS TO BE IN VIOLATION OF THE PROVISIONS HERE OF OR

FIG. 6

SIGN-UP

PERSONAL INFORMATION

| SIGN-UP PERSONAL INFORMATION |
|---|

| 1 | 2 | 3 | 4 | 5 | 6 | 7 |

*FIRST NAME:
*LAST NAME:
STREET ADDRESS:

CITY:
STATE/PROVINCE: CHOOSE A STATE
ZIP CODE:
COUNTRY: CHOOSE A COUNTRY
HOME PHONE:
*E-MAIL:
*VERIFY E-MAIL:
*CHOOSE USER NAME:
*CHOOSE PASSWORD:
*VERIFY PASSWORD:
*WHERE DID YOU PURCHASE
YOU XANBOO SYSTEM: CHOOSE RETAIL OUTLET ( BACK )    ( CLEAR FORM )    ( SUBMIT )

| COMMAND NAME | COMMAND PARAMETERS | COMMAND VALIDITY CHECKS |
|---|---|---|
| NewAccount | 1. userId<br>2. password | userId IS UNIQUE.<br>PASSWORD MUST CONTAIN ONLY VALID CHARACTERS.<br>NEW applianceGUID MUST BE UNIQUE. |
| AddXMMonitoring Module | 1. userId<br>2. password | userId AND PASSWORD MUST BE CURRENT REGISTERED USER.<br>NEW MONITORING moduleGUID MUST BE UNIQUE. |
| addUser | 1. userId<br>2. password | userId MUST BE UNIQUE.<br>PASSWORD MUST CONTAIN ONLY VALID CHARACTERS. |
| AddAppliance | 1. name<br>2. class<br>3. description<br>4. port | APPLIANCE DESCRIPTION UNIQUE TO THIS INSTALLATION. |
| AddApplianceAction | 1. applianceName<br>2. actionName<br>3. label<br>4. description<br>5. order<br>6. group | APPLIANCE NAME APPLIANCE ALREADY REGISTERED FOR THIS INSTALLATION.<br>APPLIANCE ACTION DESCRIPTION & LABEL UNIQUE WITHIN THIS INSTALLATION. |
| AddApplianceIndicator | 1. applianceName<br>2. indicatorName<br>3. label<br>4. type<br>5. order<br>6. group | APPLIANCE NAME APPLIANCE ALREADY REGISTERED FOR THIS INSTALLATION.<br>INDICATOR NAME & LABEL UNIQUE WITHIN THIS INSTALLATION. |
| AddMonitoringModuleEvents | 1. name<br>2. description | EVENT DESCRIPTION UNIQUE WITHIN THIS INSTALLATION. |

SYSTEM FOR REMOTELY MONITORING DEVICE TO OBTAIN INFORMATION SENSED BY A DEVICE COMPONENT FEATURING CLIENT APPLICATION THAT DISPLAYS VIRTUAL COMPONENT CORRESPONDING TO SENSED INFORMATION AND REMOTE SITE FOR FACILITATING COMMUNICATION BETWEEN CLIENT APPLICATION AND DEVICE

CROSS-REFERENCES TO RELATED APPLICATIONS

This application is a continuation of U.S. patent application Ser. No. 14/104,936, filed Dec. 12, 2013, which is a continuation of U.S. patent application Ser. No. 12/853,140, filed Aug. 9, 2010, now U.S. Pat. No. 8,723,664, which is a continuation of U.S. patent application Ser. No. 11/823,870, filed Jun. 27, 2007, now U.S. Pat. No. 7,796,023, which is a continuation of U.S. patent application Ser. No. 11/143,920, filed Jun. 1, 2005, now U.S. Pat. No. 7,250,854, which is a continuation of U.S. patent application Ser. No. 10/664,609, filed Sep. 16, 2003, now U.S. Pat. No. 6,943,681, which is a continuation of U.S. patent application Ser. No. 09/709,688, filed Nov. 10, 2000, now U.S. Pat. No. 6,686,838, which claims the benefit of U.S. Provisional Application No. 60/230,318, filed Sep. 6, 2000, the entire disclosures of which are incorporated by reference herein for all purposes.

BACKGROUND OF THE INVENTION

This invention relates to systems and methods for registering devices at remote sites, and more particularly, this invention relates to systems and methods for automatically registering devices at remote sites. The remote sites may be accessed by a user to control the registered devices.

Much of today's technology involves the use of equipment that is controlled from a remote location. Typically, before such equipment can be used, the equipment must first be registered at a remote location.

For example, cellular phones must be registered with a cellular phone service provider before being used. Users may purchase cellular phones from stores, but unless the phones are activated by the cellular service provider, they are useless. The activation involves the user or a retailer providing particular information about the user and his or her cellular phone to a cellular service provider. Users typically register cellular phones by calling the service provider and providing registration information using a separate telephone or by submitting to the service provider electronic forms (e.g., using a modem-to-modem connection). In either case, the probability for error is high given the human interaction involved. Furthermore, much time must be expended in these procedures.

It is therefore an object of the present invention to provide improved systems and methods for remotely registering devices.

BRIEF SUMMARY OF THE INVENTION

This and other objects of the invention are accomplished in accordance with the principles of the present invention by providing an automatic registration system having monitoring modules that communicate with remote sites. Devices at one or more locations may interface with the monitoring modules.

One or more monitoring modules and their associated interfaced devices may be referred to herein as "installations." Devices may include, for example, video cameras, still cameras, motion sensors, audible detectors, any suitable household appliances, or any other suitable device. Monitoring modules may be stand-alone devices, software applications, any suitable combination of software and hardware, or any other suitable architecture. Monitoring modules may communicate with one or more remote sites via a suitable communications network using any suitable communications protocol. The monitoring modules and remote sites may use a registration protocol to transmit registration information. The registration information may get stored in a database at the remote site. The registration protocol may be a subset of the communications protocol used between the monitoring modules and the remote sites.

An installation, any of its components, or both may be associated with a particular user account. The account holder may be any suitable entity, such as, for example, a person, a corporate entity, a family, a governmental entity, any suitable organization, or any other suitable entity capable of maintaining an account.

Association of an installation, installation elements, or both with corresponding user accounts may take place at the remote site. The remote site may make the association using any suitable database construct that may serve to cross-reference the installation, installation elements, or both with user accounts. For example, any suitable relational database schema with suitable keys may be used.

Monitoring modules may be assigned or may generate a globally unique monitoring module identification, corresponding password, model identification code, and transaction identification for use during the registration process. The monitoring module may automatically detect any devices that are interfaced with it. The monitoring module may obtain from the device any necessary or useful data in registering the devices as well as itself. The identification information and device information may be communicated to the remote site via the communications network.

Remote sites may include any suitable computer-based server or combination of servers such as, for example, web servers and database servers. Monitoring modules at installations may exchange registration protocol messages with remote sites using any protocol suitable to the chosen communications network. In an Internet-based approach, for example, installations and remote sites may exchange registration messages using HTTP (which may be processed by the web server at the remote site) over TCP/IP (e.g., IP version 6, IP version 4, etc.) over a communications network. Servers such as a web server and a database server, may interact through the use of API functions.

The remote sites may validate received registration protocol messages. Where the registration messages contain no errors, or where errors are correctable by the remote site, the registration information contained therein may be stored in a database in the database server. A confirmation message may be communicated from the remote site to the installation that may include either an ACK code that denotes successful completion of the registration process or a NAK code that may denote an unsuccessful registration attempt.

Devices may be automatically detected by a monitoring module. Automatic detection may be implemented using any suitable approach. For example, the monitoring module may communicate a handshake signal to all of its interface ports. If the monitoring module receives a response, then a device may be detected at the port from which the response was received. In another suitable approach, a particular pin of the interface port may be used to denote whether power is being sent through the port (i.e., to power a device). If the value of the pin is high, for example, the monitoring module may deduce that a device is coupled to the monitoring module at that port. In another suitable approach, a user may proactively have the monitoring module detect a particular device. For example, the user may press a button on the device that may cause the device to send a communication to the monitoring module, thus alerting the monitoring module of the device's presence.

In one suitable embodiment of the present invention, virtual representations of devices may be registered. Virtual representation may be made up of resources, which may be, in turn, made up of components. Components may be used to indicate the state of a corresponding physical device component. Components may be used to change the state of a corresponding physical device component. Virtual representations of devices may be accessed by users who are authorized to access the virtual representations. These users may be those users that are associated with the user account with which the corresponding devices (of the virtual representations) are also associated.

New devices or monitoring modules may be added to a registered installation and automatically detected and registered by a new object discovery process. New object discovery may be conducted by registered monitoring modules, the remote site, or by any other suitable element of the automatic registration system. The new object discovery may be conducted on a continuous basis or on a periodic basis. If desired, the new object discovery need not be automatic, but may be instantiated by the user (e.g., through simple software or hardware manipulation).

BRIEF DESCRIPTION OF THE DRAWINGS

FIG. 5 shows an illustrative registration display screen for a service agreement in accordance with an embodiment of the present invention.

FIG. 6 shows an illustrative registration display screen for requesting information from a user in accordance with an embodiment of the present invention.

FIG. 14 shows illustrative commands, their parameters, and validity checks in accordance with an 5 embodiment of the present invention.

FIG. 17 shows an illustrative registration display screen that displays the assigned notification action for a particular event in accordance with an embodiment of the present invention.

DETAILED DESCRIPTION OF THE INVENTION

Figure 1:
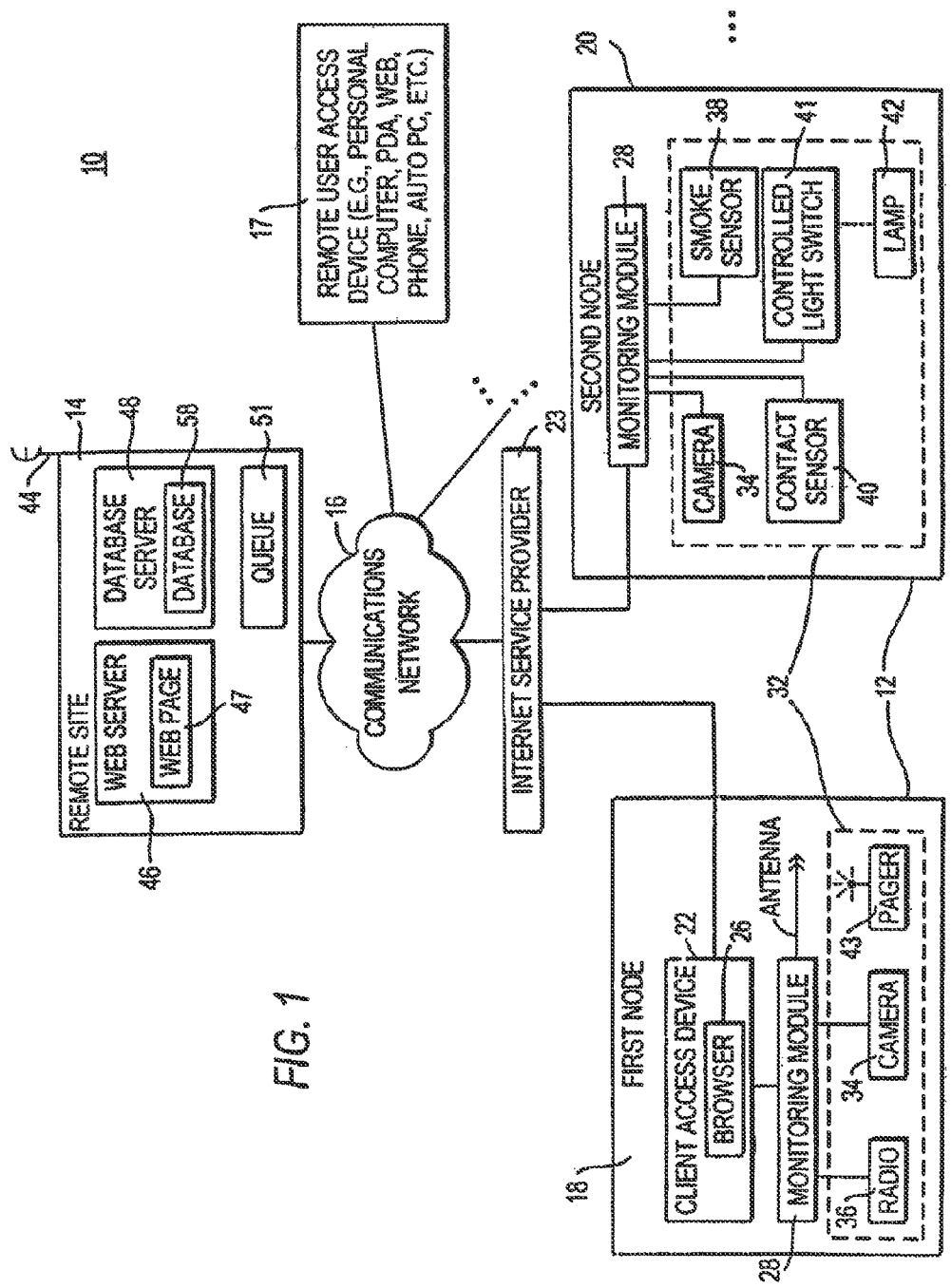
FIG. 1 is a block diagram of an illustrative automatic registration system in accordance with an embodiment of the present invention.

FIG. 1 shows an illustrative system 10 in accordance with the present invention. For purposes of clarity, and not by way of limitation, an illustrative client-server based embodiment of the present invention is herein described. System 10 may include an installation 12 and a remote site 14 that may be linked via a communications network 16. In practice, there may be more than one remote site 14 and installation 12, but only one each is shown to avoid over-complicating the drawing. Remote site 14 may be any suitable remote site that may include equipment such as, for example, one or more servers, mainframes, personal computers, or any other suitable computer-based equipment. Remote site 14 may include a network of suitable computers that may be interconnected in any suitable way, such as, for example, through a local area network, wide area network, telephone network, cable television network, Intranet, Internet, or any other suitable wired or wireless communications network. Communications network 16 may be any suitable communications network, such as, for example, a local area network, wide area network, telephone network, cable television network, Intranet, Internet, or any other suitable wired or wireless communications network. Some suitable wireless communications networks may be global system for mobile communications (GSM), time-division multiple access (TDMA), code-division multiple access (CDMA), Bluetooth, or any other suitable wireless communication networks. Installation 12 and remote site 14 may communicate over communications network 16 using any suitable protocol or protocol stack. For example, installation 12 and remote site 14 may communicate via a transmission control protocol/Internet protocol (TCP/IP) environment using, for example, IP version 4 or IP version 6 (that supports 128-bit network addressing) and a hypertext transfer protocol (HTTP). In another approach, universal plug and play (UPnP) technology may be used to allow communication between installation 12 and remote site 14. Any suitable request-response type of protocol and socket-based packet transport stack, or suitable peer-to-peer communications approach may be used as desired.

Installation 12 and remote site 14 may communicate using any suitable communications. Communications may include, for example, commands, requests, messages, remote procedure calls (e.g., using a proxy-stub pair), or any other suitable client-server or peer-to-peer communication. Communications may also involve, for example, complex communications between application constructs running on installation 12 and remote site 14. Objects running on the client and server may, for example, communicate using an Object Request Broker (ORB). Transmitted information may, for example, be encapsulated as COM objects or Javabeans and persisted to files that are transmitted over a remote access link. In another suitable approach, access communications may include hypertext markup language (HTML) formatted markup language documents (e.g., web pages), that are exchanged between installation 12 and remote site 14 via ISP 23 and communications link 16. For example, communications may consist of a series of HTTP posts and responses in which the parameters for the transmissions may be sent as name/value pairs in the normal post method. In order to achieve the result of transmitting multiple commands in a single command string, numbered commands may be parsed out and executed at remote site 14. Remote site 14 may be responsible for parsing the command string into individual commands and executing each of those commands. In order to achieve this task of parsing the commands, remote site 14 may utilize a script language and interpreter such as Personal Home Page Tools (PHP) which is embedded within a Web page along with its Hypertext Markup Language (HTML). For example, before a page is sent to the requesting user, the Web server may call PHP to interpret and perform the operations called for. Other similar technologies may also be utilized such as JavaScript, Microsoft's VBScript, or any other applicable script interpreter. If desired, any other suitable client-server or peer-to-peer based approach may be used.

Installation 12 may be operated by a local user. Installation 12 may include one or more nodes. For purposes of illustration, FIG. 1 illustrates an approach having two nodes, first user node 18 and second user node 20. It should be understood that nodes 18 and 20 may be located at a single location, such as the user's main residence. If desired, nodes may be located across more than one location. For example, one node may be in a user's main residence and another at the user's vacation house.

In one embodiment of the present invention, user node 18 may include a client device 22 that may be connected to communications network 16. In Internet-based approaches, such as, for example, as in the embodiment shown in FIG. 1, client device 22 may be connected to the Internet via an Internet service provider (ISP) 23. Client device 22 may be any device suitable for communicating with remote site 14 via communications network 16. For example, client device 22 may be a computer, a personal digital assistant (PDA), a terminal, a set-top box, or any other suitable device that provides access to remote site 14 via communications network 16. Client device 22 may include, for example, an Internet browser application that may be used to access web pages via communications network 16. In other suitable approaches, client device 22 may run a client application that provides locally generated displays propagated with a format obtained using any suitable client-server or peer-to-peer scheme.

Client device 22 may communicate with ISP 23 or directly with communications network 16 using any suitable communications link. For example, the link may include a telephone dial-up link, digital subscriber lines (DSL), a cable modem link (e.g., a data over cable service interface specification (DOCSIS)), a satellite link, a computer network link (e.g., Ethernet link, T1 line, etc.) or any other suitable communications link or combination of communications links.

Remote site 14 may include one or more servers such as, for example, web server 46 and database server 48. Database server 48 may maintain database 58. In other suitable approaches, such as non-Internet based approaches, remote site 14 may include an application server and any other suitable server or combination of servers. As herein used, the term "server" is not limited to a distinct piece of computing hardware or storage hardware, but may also be a software application or a combination of hardware and software. For example, one computer may have software that enables the computer to act as both a web server and as a database server.

In some suitable approaches, remote site 14 may provide displays or display definitions to client device 22. In the Internet-based approach of FIG. 1, for example, web server 46 may generate static and dynamic web pages from data supplied by database server 48. Web page 47 may be viewed by a user using Internet browser 26 running on client device 22.

Software applications interfacing installation 12 with remote site 14 may be created using any suitable platform and/or software development tools. For example, Java 2 Enterprise Edition, Javabeans, component object model (COM) based technologies (e.g., ActiveX, object linking and embedding (OLE), etc.), Javascript, Visual Basic, C, C++, scripting languages, or any combination of these or other suitable development tools may be used in creating the software interface between installation 12 and remote site 14 (e.g., web-page interface). Any combination of these or other suitable development tools may be used in preparing any other software modules or applications for use in any other suitable facet of the present invention.

Remote site 14 may function as the master controller of the system shown in system 10. In addition, users may access the system shown in system 10 via any computer, monitoring module, or remote user access device linked to communications network 16. Remote user access devices (such as remote user access device 17 in FIG. 1) may include, for example, personal digital assistants, cellular telephones, set-top boxes, personal computers, or any other suitable device a user may use to access remote site 14 via communications network 16.

Monitoring modules 28 may serve as an interface between remote site 14 and at least one connected device 32. Monitoring modules 28 may, be any suitable hardware, software, or a combination thereof and may be included at any point within the system. For example, monitoring module 28 may be a software application running on client device 22 or a separate piece of hardware that may be connected to client device 22 (as shown at node 18) or partially implemented as software on client device 22 and a separate piece of hardware. In some embodiments, monitoring module 28 may be a stand-alone appliance (as shown at node 20) connected to communications network 16, operating separately and independently from client device 22. Each monitoring module may be shipped with a model identification code, or with the capacity to generate such a code, that may serve to identify each particular monitoring module's model type.

One or more monitoring modules may be installed at one or more locations. Monitoring modules may be installed by the user (or any other suitable person) by, for example, connecting the modules to client device 22 that may communicate with remote site 14 over communications network 16. The connection between the monitoring module and the client access device and between devices and the monitoring module may be in the form of a universal serial bus (USB) connection, parallel port connection, serial connection (e.g., RS-232), Firewire connection, any combination of these, or any other suitable type of connection. If desired, monitoring modules may be given the capability (e.g., processing hardware, communications equipment, etc.) to communicate, via communications network 16, without the use of a client access device. Monitoring modules may link attached devices or appliances (e.g., sensors, cameras, microwaves, refrigerators, etc.) with remote site 14 via communications network 16. One or more monitoring modules 28 may provide data from attached devices and appliances to remote site 14 via communications network 16. The term "device," as defined herein, shall include any suitable device or appliance.

At least one device 32 may be interfaced with and controlled by each monitoring module 28. Connections between monitoring module 28 and the various devices 32 may be hardwired or wireless (e.g., using Bluetooth technology). Devices 32 may encompass any suitable device capable of being controlled or mediated by an external controller. Such devices may include, but are not limited to, a camera 34, a radio 36, a smoke or fire detector 38, a contact sensor 40, and a light switch 41. Although not illustrated, other suitable devices may include, for example, various audio input and output devices, various visual displays, washers/driers, microwave ovens, cooking ranges, car alarms, plant watering devices, sprinkler, thermostats, carbon monoxide sensors, humidistats, rain gauges, video cassette recorders, radio tuners, or any other suitable device and the like.

One or more notification devices, such as pager 43, may also be incorporated into the system. As illustrated in FIG. 1, pager 43 is in wireless communication with a wireless or cellular transmitter 44 associated with remote site 14. Other suitable notification devices include, for example, e-mail clients, wireless hand-held computers, wireless wearable computer units, automatic web notification via dynamic web content, telephone clients, voice mail clients, cellular telephones, instant messaging clients, and the like.

System 10 provides users with opportunities to remotely control and monitor devices 32 using remote user access devices 17 via communications network 16. In the example of FIG. 1, users may control devices 32 that are interfaced with monitoring modules 28 at node 18 and devices 32 interfaced with monitoring module 28 at node 20. In practice, there may be a single node, or more nodes, depending on, for example, the user's equipment, number of sites, or other suitable parameters. In practice, a suitable system architecture and communications network 16 may allow users, or anyone that user's permit, to readily monitor and control monitoring modules 28 from any location using any suitable device that is capable of communicating with remote site 14 via communications network 16.

In another suitable approach, users may access installation 12 using remote user access devices 17 without the use of remote site 14. For example, remote user access devices 17 may be used to communicate with monitoring modules 28 of installation 12 via communication network 16 and ISP 23. If desired, two-way communications may be implemented using this approach. Remote user access device may access installation 12 using, for example, special IP addresses assigned to a particular monitoring module, node, installation, or any other suitable element of the installation. The use of IP addresses is merely illustrative. Any other suitable addressing may be used to allow access to an installation from a remote used access device.

Devices 32 may be programmed at the installation in terms of how they respond to certain events (e.g., what does the camera do when the contact sensor is triggered?). Alternatively, devices 32 may be programmed from a remote location using remote user access device 17, for example. The programming may be stored in devices 32, monitoring modules 28, or at remote site 14.

The following examples of the uses of illustrative devices will illustrate the operation of the present invention. For example, contact sensor 40 of FIG. 1 may be associated with the front door (not shown) of a remote location associated with second node 20. Contact sensor 40 may be configured to trip whenever the front door is opened. Camera 34 is also positioned to view the front door location and may be programmed to take a digital picture whenever the sensor contact 40 is tripped. This picture may be transmitted over communications network 16 and stored in database server 48. When contact sensor 40 detects that the front door has been opened, an event notification or alarm trigger may be transmitted by monitoring module 28 to database server 48. Database server 48 may have been previously programmed to transmit a notification event to the user's pager, for example, via cellular transmitter 44. As the contact sensor is tripped, camera 34 may take a picture of the front door and may transmit that picture, via monitoring module 28 and communications network 16, to database server 48. The user, having been notified via pager 42, may now access the picture using web server 46 of remote site 14 via Internet browser 26. In this way, the user may determine who has entered the front door of his or her home.

As another example, system 10 may allow a user located at one node 18 to control a device at a second node 20. The user may contact web server 46 via, for example, Internet browser 26 of node 18 in order to access a database entry for light switch 41 of node 20. A virtual representation of the light switch 41 may be made available to the user by web server 46 and may be manipulated by the user to remotely change the state of light switch 41 and the connected lamp 42. For example, the system may allow the user to change the state of lamp 42 from being "off" to being "on" by, for example, manipulating the virtual light switch from web server 46 and a corresponding command would be placed in the queue of waiting commands on the server component.

Periodically, the controlling module or monitor 28 may poll remote site 14 looking for waiting commands, such as the change state command of light switch 41. Thereafter, the command may be transmitted to monitoring device 28 that would instruct the light switch-to change from the "off" state to the "on" state, thus turning on lamp 46. This change in state of lamp 46 may be viewed by an appropriately positioned camera, such as camera 34, which would be used to visually monitor the remote location 20 to determine whether the command had been completed successfully. If the command had not been successfully completed, then an error message may be communicated to the user, using for example, the means specified by the user's notification preferences or through any other suitable means of communicating information to the user. This is merely an illustrative approach for detecting a change is state of a device. In another suitable approach, lamp 46 may be in two-way communications with a corresponding device driver. The device driver may query the lamp to determine whether it was on after executing a "turn on" command. Any such suitable approach may be used for detecting a state in change of a device.

Figure 2:
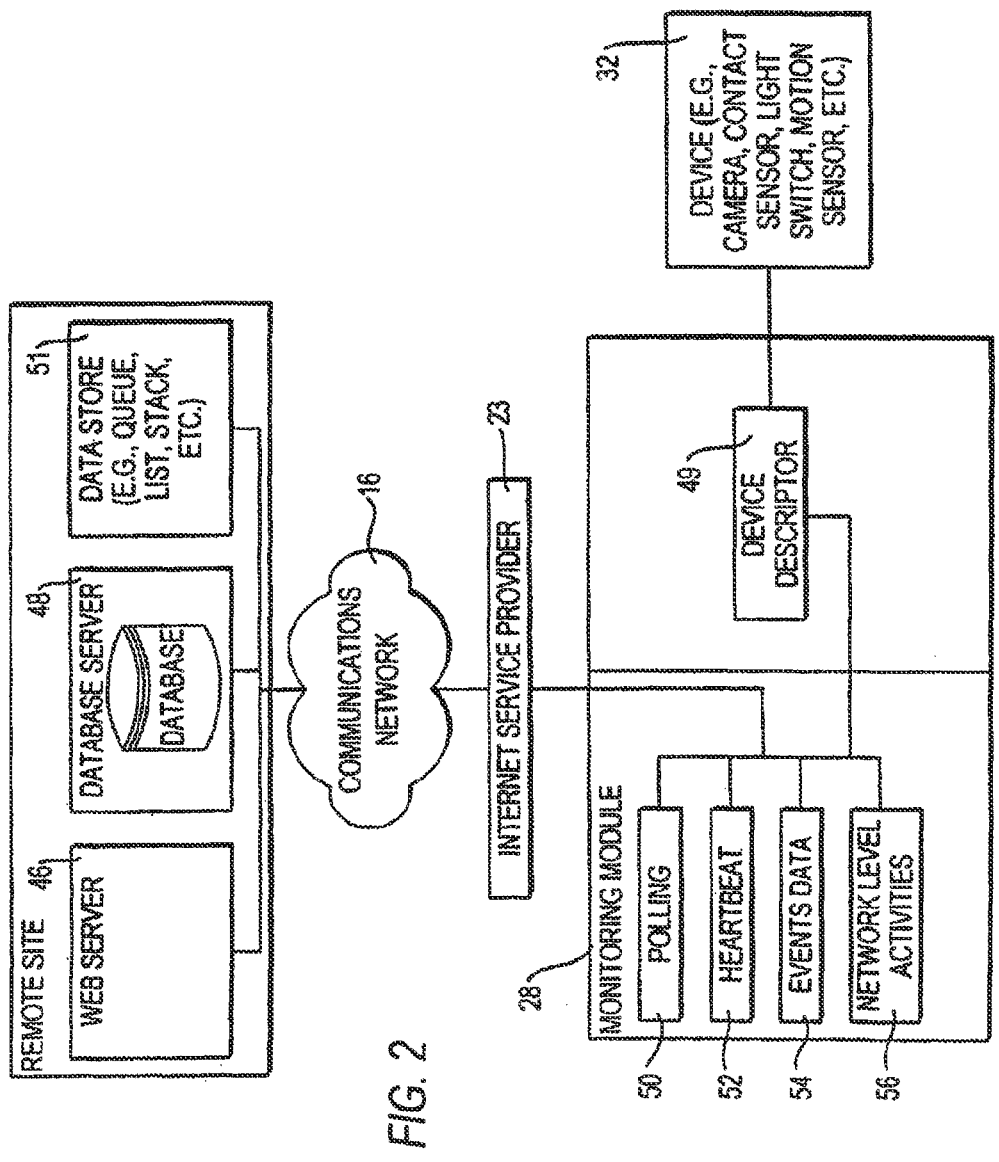
FIG. 2 is a block diagram of some of the components of the illustrative automatic registration system of FIG. 1 in accordance with an embodiment of the present invention.

Referring now to FIG. 2, monitoring module 28 may serve, for example, as a common connection point for one or more devices 32 at an installation 12 and as the interface between devices 32 and remote site 14 via communications network 16. Monitoring module 28 may, for, example, serve as a translation and brokering agent between remote site 14 and devices 32.

In one suitable embodiment, monitoring module 28 may be software made up of multiple dynamically loaded objects, or device descriptors 49, that may allow remote site 14 to interface with the devices 32. The dynamically loaded device descriptors 49 may act as device drivers for devices 32, translating, in both directions, monitoring, command, and control data exchanged between monitoring module 28 and remote site 14 via communications network 16. Each device descriptor 49 may also translate the signals received from monitoring module 28 into the specific electrical signals that are required to communicate with (both input and output) and control its associated device 32. Device descriptor 49 may be provided for each specific device 32 when, for example, different devices 32 have different interfaces and require specific sets of electrical signals for their monitor and control.

Device descriptors 49 may include, for example, a manufacturer identification, product identification, and driver version number to allow a device to be referenced correctly. Once a new device 32 has been detected and is to be integrated into the system, monitoring module 28 may reference, download, and run the appropriate drivers for the new device.

After loading a new descriptor 49, monitoring module 28 may communicate with remote site 14 to determine whether device 32 has been previously catalogued. Monitoring module 28 may, for example, determine if a general description and a default state of device 32 exists at the remote site. When a device 32 has been catalogued, then, for example, static parameters, such as the manufacturer name, may be communicated from monitoring module 28 to remote site 14 and the default state of device 32 may exist at remote site 14. When a device 32 is not already catalogued, device 32 may communicate its default state and static parameters to monitoring module 28 that may, in turn, communicate the default state and static parameters to remote site 14. The communication from monitoring module 28 to remote site 14 may be done using name/value pairs using, for example, the normal HTTP post method discussed hereinbefore. For example, a template document may be a static parameter of device 32.

Figure 3:
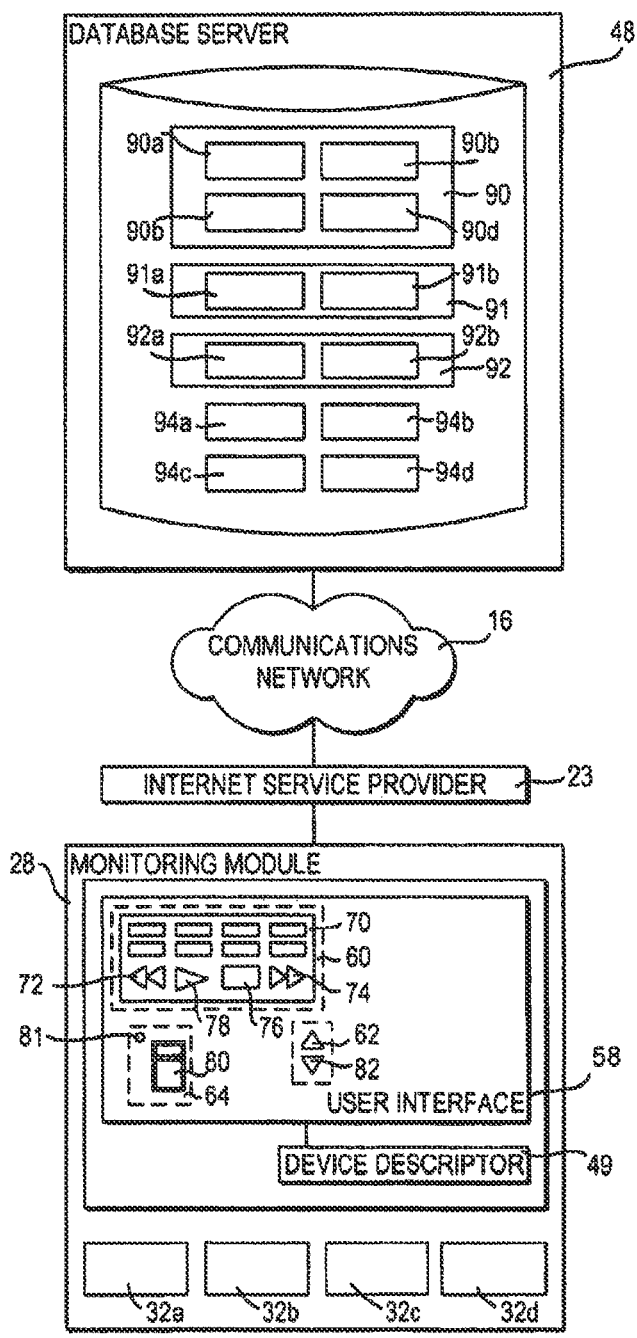
FIG. 3 is a block diagram of some of the components of the illustrative automatic registration system of FIG. 1 in accordance with an embodiment of the present invention.

FIG. 3 shows five devices, 32, 32a, 32b, 32c, 32d. In practice, there may be more or fewer devices with each installation. Each device may be interfaced to a monitoring module 28 via a device descriptor or driver 49 (only one shown). Each device may include a customizable user interface 58 that may be viewable on a remote user access device over communications network 16. Interfaces 58 may include virtual representations of the actual user interfaces of the devices.

In another approach, virtual representations may be stored on, for example, web server 46. Remote site 14 may use changes in device states to change the virtual representations of the devices with which the changed states are associated. A virtual representation of a device, as previously described, may be either a text-based, symbol-based, or image-based representation of an actual device 32 from the installation as it appears to a user who accesses the remote site from a location remote to the installation using any suitable remote user access device. For example, if the device is a light switch, the corresponding virtual representation may be an indicator icon that may be either green or red If the indicator icon is green, that may denote that the actual light switch is in the "on" position. If the indicator is red, that may denote that the light switch is in the "off" position. If, during a heartbeat operation, remote site 14 is informed that the state of the light switch changes from "on" to "off," then the virtual representation of the light switch may change from being green to being red.

User interface 58 may include at least one resource. In the example of FIG. 3, resources 60, 62, and 64 are shown. Resources may provide users with access to features specific to their associated device. For example, the device shown in FIG. 3 represents a videocassette recorder (VCR) having a recording setting resource 60, a channel selecting resource 62, and a power selecting resource 64. Typical VCRs may have other operational resources, but the resources illustrated in FIG. 3 are sufficient to illustrate the operation of the device.

Each resource 60, 62, 64 may include one or more display components. For example, the recording setting resource 60 includes a display component 70 and a series of pushbuttons 72, 74, 76, 78 which a user may use to activate the VCR's fast forward, reverse, play, and stop functions, respectively. The channel selecting resource 62 may include the display component 70 and a pair of pushbuttons 82 that users may use to activate up channel and down channel functions of the VCR. The power selecting resource 64 may include a toggle switch 80 that user may use to activate the VCR's power on and power off commands, and an LED indicator 81 that may indicate the power condition of the VCR.

Other suitable display components may include toggle buttons, radio buttons, absolute sliders, proportional sliders, edit fields, labels, images, video clips, streaming video, streaming audio, multiselect list, time fields, date fields, N-directional components, N-state buttons, N-state selectors (where N may be any suitable integer), trees, tables, graphs, charts, drawing pads, streaming audio, banners, or any other suitable display components. Display components may act as status indicators. If desired, display components allow users to toggle settings or otherwise manipulate devices 32. For example toggle buttons may serve as indicators, showing, for example, whether a device is in the "on" position or in the "off" position. Toggle buttons may allow users to change the state of a device, by, for example, turning a device on or off. Sliders may act as indicators by showing, for example, the percentage complete of a particular process a device may be performing (e.g., baking a cake), and may allow users to change the state of a device (e.g., changing the thermostat temperature). Edit fields may allow users to change textual representations of suitable elements (e.g., naming a television show to be recorded by the show's name). Video, audio, images, or any other suitable media-based components may act as indicators showing what the devices are sensing (e.g., images may be sensed by cameras, streaming video may be sensed by camcorders, audio clips may be sensed by audio recorders, etc.). Date and time fields may act as indicators, by, for example, displaying what date and time a VCR is set to start recording. Date and time fields may allow users to set the date and time a VCR may start recording. Multiselect lists may act as indicators by, for example, listing all sound sensors that are detecting noise in the house. Multiselect lists may also be used, for example, to select some of a number of available sensors to turn on.

A virtual representation of each device 32, 32a, 32b, 32c, 32d may be stored as a record 94, 94a, 94b, 94c, 94d in the database of database server 48 of remote site 14. Each record may contain an entry for each resource and its associated components which make up the device. For example, record 94 for VCR device 32 may contain an entry 90, 91, 92 for each resource 60, 62, and 64, respectively, and an entry 90a, 90b, 90c, 90d, 91a, 91b, 92a, and 92b for each component 70, 72, 72, 74, 80, 81, and 82, respectively. In addition, a web page 47 may be generated by web server 46 by extracting the associated record for that device from database server 48 and creating a graphical, textual, tactile, aural, or other similar modality user interface representation of that device that the user may access via, for example, Internet browser 26.

One of the functions that monitoring module 28 may serve is to persist the state of devices 32. This may be done, for example, to allow the real-time states of devices 32 to be stored, to communicate to remote site 14, or to allow for easy recovery from a system crash.

The stored state of devices 32 may also be used for maintaining a synchronized relationship between an installation 12 and remote site 14. In one possible embodiment of the present invention, remote site 14 and installation 12 may use polling and heartbeat mechanisms in order to synchronize state information between remote site 14 and installation 12. Polling may refer to a process whereby monitoring module 28 obtains commands from remote site 14. The commands may reside, for example, in command queue 51. Commands may be accumulated at command queue 51 as a result of any suitable action by the user, by remote site 14, or by both. For example, a user may use a remote user access device to issue a command or a request to remote site 14 to cause a change in state of one of devices 32 (e.g., to turn a lamp on). Remote site 14 may post the change in state command to a command queue 51.

Monitoring module 28 may communicate a request for pending commands to remote site 14. This request may be communicated periodically as part of the polling process. In response to the monitoring module's request, remote site 14 may provide one or more pending commands from command queue 51, and may notify monitoring module 28 of the number of remaining pending commands in command queue 51. Monitoring module 28 may then again communicate a request for pending commands. Remote site 14 may return more of the pending commands from command queue 51. This process may continue until command queue 51 at remote site 14 is empty.

Remote site 14 may provide commands to monitoring module 28 using any suitable algorithm. For example, remote site 14 may return commands using first-come, first-serve, round robin, first-in, first-out, weighted prioritization, or any other suitable algorithm. Remote site 14 may also proactively inform monitoring module 28 that commands are waiting in queue 51. Monitoring module 28 may then poll remote site 14 and retrieve commands from remote site 14 until the queue is empty.

Whereas polling process 50 is used by remote site 14 to effect state changes in devices 32 via monitoring module 28, monitoring module 28 may use heartbeat process 52 to update device state information at remote site 14. A heartbeat may be a periodic communication from monitoring module 28 to remote site 14 containing updated state information for devices 32 associated with monitoring module 28. In one suitable heartbeat process 52, monitoring module 28 may send a communication to remote site 14 in response to a change in state of a device 32, a synchronization of a device 32 with remote site 14, a triggered alert event, or in response to any other suitable event. In such a heartbeat operation 52, all data intended to be transmitted to remote site 14 may be transmitted to remote site 14 via communications network 16.

Remote site 14 may transmit an acknowledgment of receipt and successful processing of the data back to monitoring module 28.

Remote site 14 may direct monitoring module 28 to make changes in its own state by, for example, posting commands to data store 51. For example, remote site 14 may post commands that set or modify the polling 50 or heartbeat 52 time intervals. Upon reaching the end of the current polling interval, monitoring module 28 may send a communication to remote site 14, requesting any queued commands. Monitoring module 28 may continue to poll, using a preselected communication scheme, until the queue of commands waiting for monitoring module 28 is empty. Each command received from the queue may be acted upon when the command is received and any associated state changes are effected. Remote site 14 may transmit an acknowledgment of receipt and successful processing of the data back to monitoring module 28.

If desired, remote site 14 may send unsolicited communications to monitoring module 28. Remote site 14 may send communications to, for example, set or update the heartbeat or polling time, or to cause monitoring module 28 to issue a command to update a component of a device. Remote site 14 may send unsolicited communications to monitoring module 28 for any other suitable purpose.

In addition to maintaining the polling and heartbeat operations and exchanging communications for events, data, and commands 54 with remote site 14, monitoring module 28 may also take care of many network level activities 56. These activities may include, but are not limited to verifying passwords, dialing up an ISP, if necessary, periodically uploading accounting/billing information, and performing security measures. Any other suitable network level activities may be performed by monitoring module 28.

The present invention may provide a registration process. The registration process may be used to allow the registration of new users, monitoring modules, and available devices at remote site 14. Using information from the registration process, remote site 14 may provide the registered user with access to the functionalities of the registered monitoring module and registered devices. Users may access the functionalities of the modules and devices via communications network 16.

A user or users of installation 12 may open an account with remote site 14 to use services offered by remote site 14. For example, the user or users of installation 12 may open an account with remote site 14 by accessing web server 46 of remote site 14 via, for example, web browser 26. If desired, accounts may be opened using any other suitable approach, such as, for example, using a telephone, or mailing in a physical contract. Information provided for the purposes of opening an account with remote site 14 may be stored in database server 48.

Figure 4:
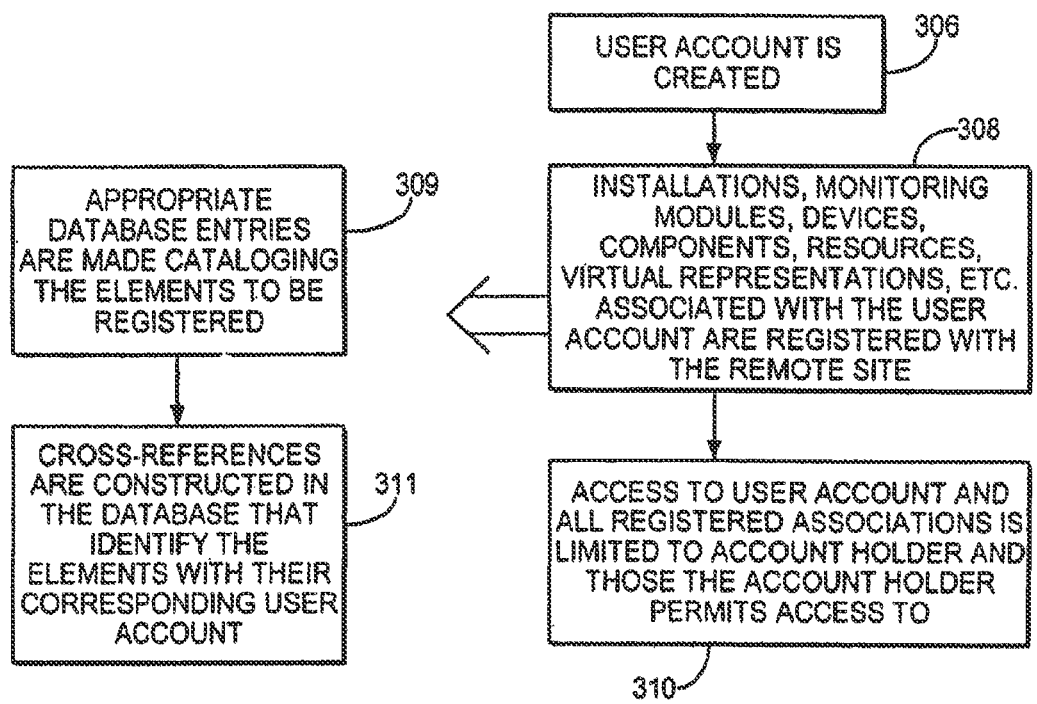
FIG. 4 is a flow chart of illustrative steps involved in associating an installation with a user account during the registration process in accordance with an embodiment of the present invention.

In one suitable embodiment of the present invention, users may be required to create accounts before installations, monitoring modules, devices, components, virtual representations, or other elements of the system that are associated with a particular user or entity may be registered with remote site 14. Subsequent access to the registered installations may be granted only to the user account holder or to those that the user account holder has permitted access. FIG. 4 is flow chart of illustrative steps involved in associating registered installations (and the registered elements making up the registered installations) with a particular user account. At step 306 a user account is created. Registration of the user's installations takes place at step 308. Step 308 may include steps 309 and 311. At step 309, appropriate database entries may be made in database 58 that catalog the elements to be registered (which may effectively serve to register the elements at remote site 14). At step 311, remote site associates the registered elements with their corresponding user account. This may be done using any suitable cross-referencing technique. For example, in a relational database, a separate table may list all installations in one field and the corresponding user accounts in another field. Another table may list all installations in one field (that may act as a key field to the first table) and all associated elements in another field. This is merely an illustrative relational database structure for cross-referencing installations and their elements with corresponding user accounts. Any other suitable database construct may be used.

Once the registration process is completed, the user account holder and those entities that the user account holder permits access to, may access the registered installations at step 310.

Monitoring modules 28 may also register with remote site 14. Information regarding monitoring modules 28, such as model identification, attached devices, etc. may also be stored in database server 48. Once a monitoring module is registered, it may register its attached devices with remote site 14. Information associated with devices, such as device names, may be stored in database server 48 and made available to the user. Each device 32 may communicate with monitoring modules 28 and export its customized interface to database server 48. If the interface is not customized, a default interface may be used.

The registration process of the present invention may require user interaction locally, remotely, or both. For example, the system may prompt users to enter registration information on a web site that is resident on web server 46. The system may, for example, require users to set or adjust system settings using set-up software running locally on user access device 22. The set-up information may subsequently be communicated to remote site 14. Any suitable combination of local and remote registration processes may also be used.

FIGS. 5-9A, 10, 11, and 17 are illustrative displays that the system may provide to the user during the registration process. Although the displays shown in FIGS. 5-9A, 10, 11, and 17 are shown as web pages, it should be understood that the displays need not be limited to being displayed in a web browser or using an Internet-based or client-server based approach. For example, the displays may be generated by web server 46. The displays shown in FIGS. 5-10, 15, and 16 are merely illustrative. If desired, any other suitable displays may be used. FIG. 5 shows an illustrative service agreement display that the system may provide as one of the first screens in the registration procedure. When the user agrees to the terms of the service agreement, the system may then prompt the user for personal information as shown in FIG. 6. The system may, for example, prompt the user for a login identifier and password.

Figure 7:
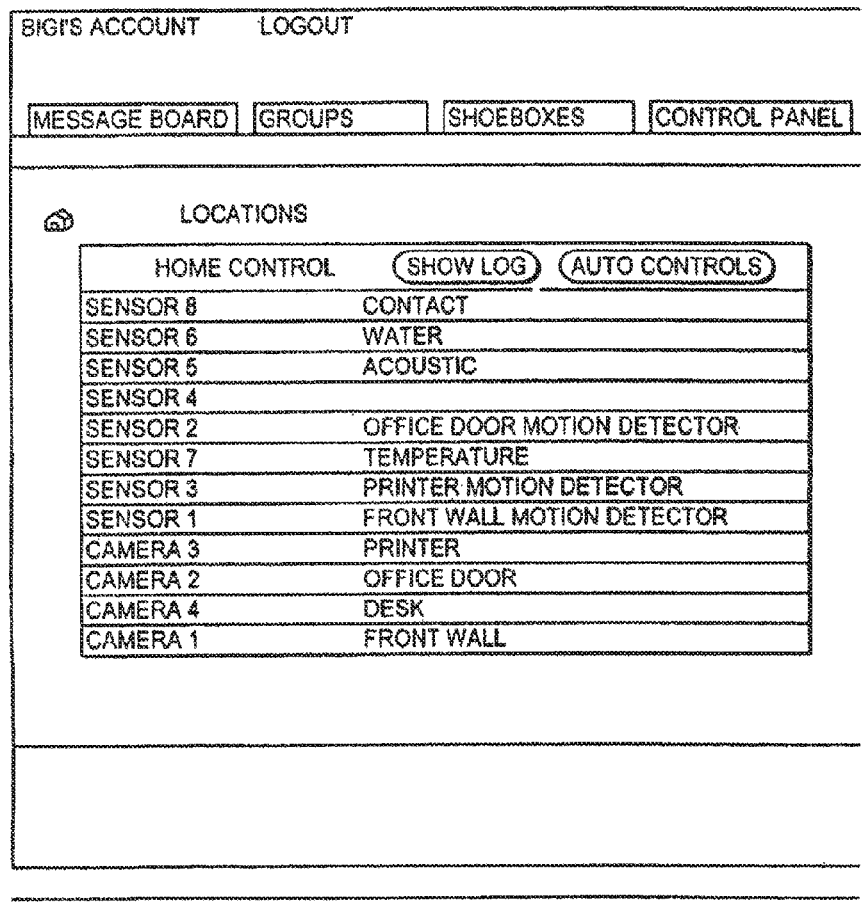
FIG. 7 shows an illustrative registration display screen for showing user-assigned names for particular devices in accordance with an embodiment of the present invention.
Figure 8:
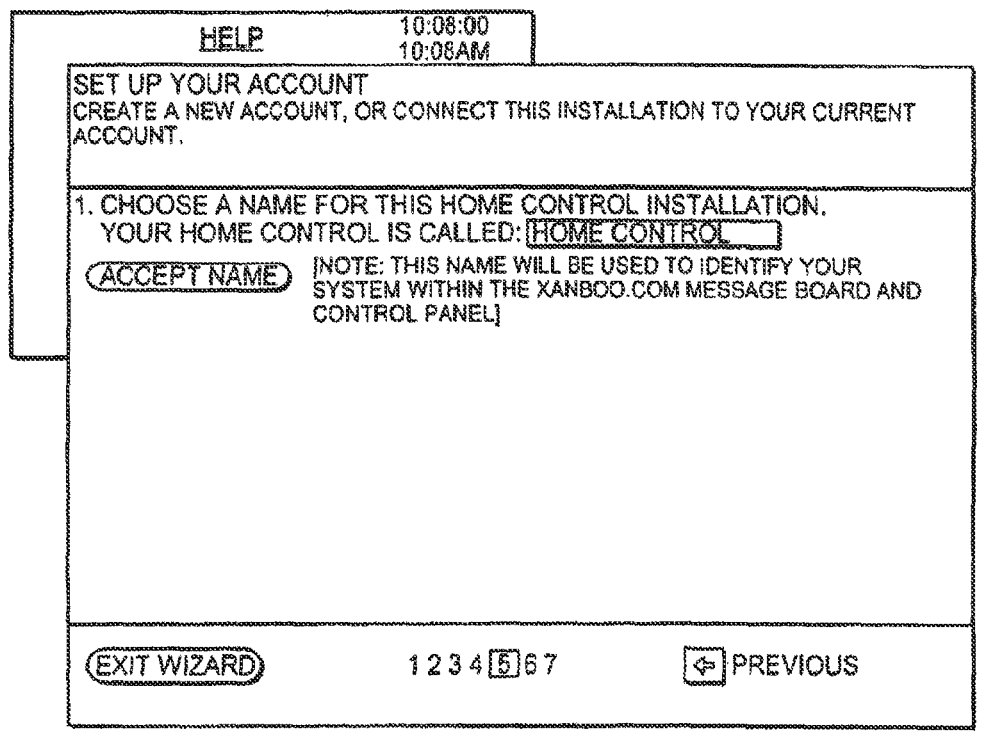
FIG. 8 shows an illustrative registration display screen for allowing a user to name an installation being registered in accordance with an embodiment of the present invention.

The system may provide the user with opportunities to set names or identifiers for monitoring modules and/or connected devices. FIG. 7 shows an illustrative display listing devices for a particular installation and the devices' corresponding names and/or descriptions. The system may provide the user with an opportunity to enter names for the monitoring module, the devices, or both, during the registration process. If desired, an entire installation may be given a name chosen by the user. FIG. 8 shows an illustrative display that prompts the user for an installation name.

Figure 9A:
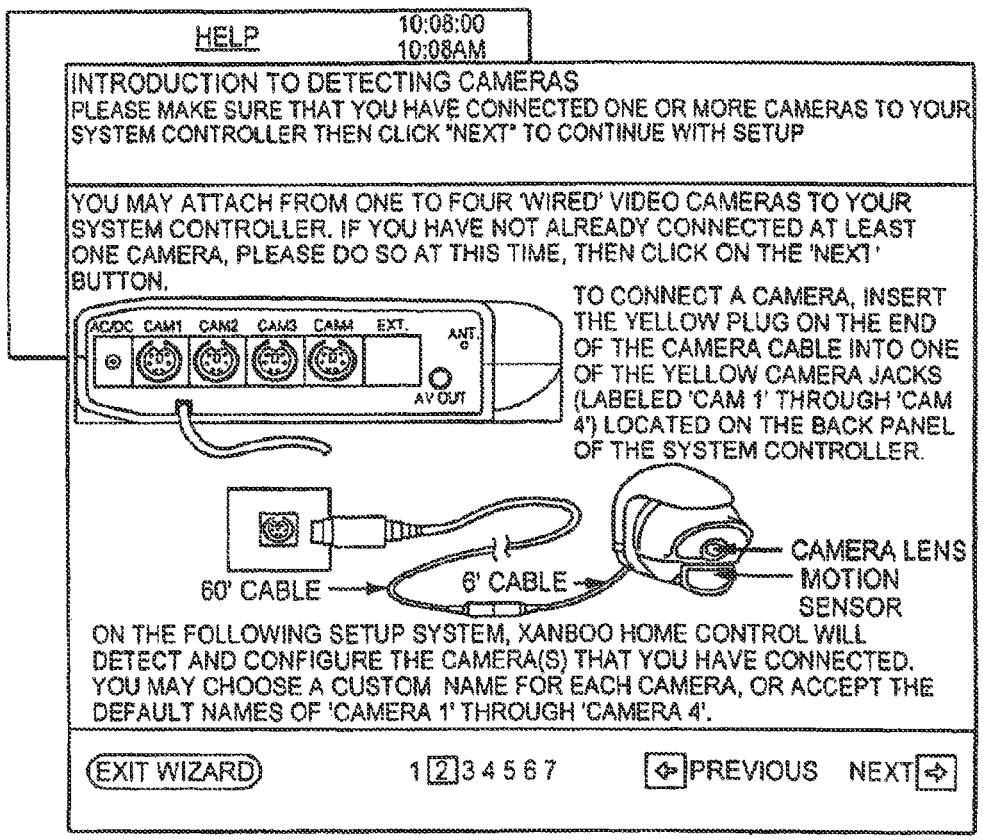
FIG. 9A shows an illustrative registration display screen for instructing the user on how to attach devices to a monitoring module in accordance with an embodiment of the present invention.

If desired, the system may provide displays instructing users how to connect various devices and how to register them with remote site 14. FIG. 9A shows an illustrative display having instructions on how to connect a camera to the monitoring module in order for the camera to be automatically detected and registered with remote site 14.

Automatic detection of devices may be implemented using any suitable software, hardware, or both that may allow devices coupled to a monitoring module to be automatically detected. The approach employed for implementing automatic detection may depend on whether there is one-way communications between devices 32 and monitoring module 28 (i.e., from devices 32 to monitoring module 28) or whether there is two-way communications.

Figure 9B:
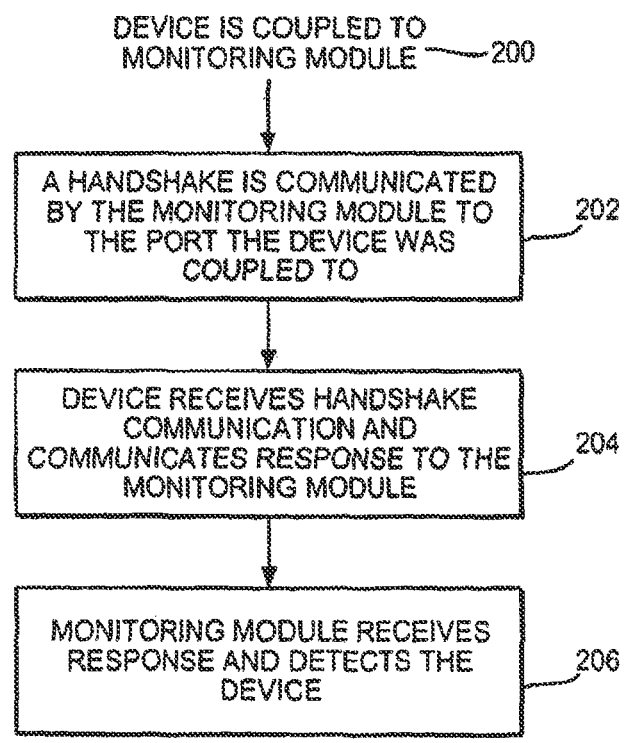
FIG. 9B is a flow chart of illustrative steps involved with using handshaking for automatic device detection in accordance with an embodiment of the present invention.

In one suitable approach monitoring modules may continuously, periodically, or in response to one or more particular events, attempt to handshake with devices. This is illustrated by FIG. 9B. The monitoring module may send a handshake message through all of its interface ports (e.g., USB, parallel, serial, IEEE 1394, infrared, proprietary, and any other suitable wired or wireless based port) in an attempt to reach all devices that may possibly be coupled to the monitoring module (step 200). The monitoring module may use any suitable algorithm in sending handshake communications to its interface ports. For example, the communications may be sent sequentially, using round robin, weighted fair queuing, or any other suitable algorithm. If a device is coupled to the monitoring module the handshake communication may be sent to the port to which the device was connected (step 202). At step 204, the device may respond to the handshake communication (e.g., with another handshake communication). If a response is received by the monitoring module, then at step 206, the device that communicated the response is detected by the monitoring module. The monitoring module may then request additional information from the detected device (e.g., to use in the registration process). If no response is received from a particular port, then a device is not detected at that port.

If devices are daisy-chained, the handshake may be passed on from one device to another in the chain. Responses from the daisy-chained devices may be returned from one device to the next until the responses reach the monitoring module.

Figure 9C:
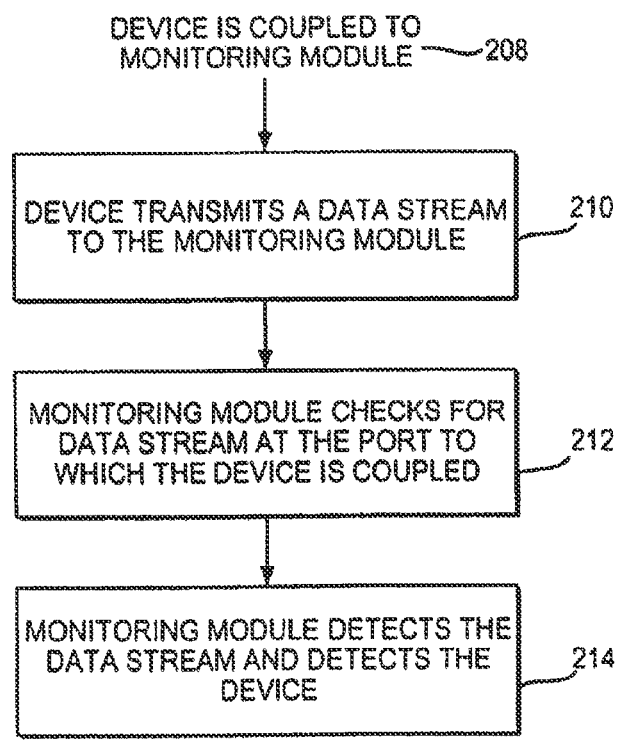
FIG. 9C is a flow chart of illustrative steps involves with detecting data streams for automatic device detection in accordance with an embodiment of the present invention.

The use of handshakes is merely an illustrative approach for the automatic detection of devices. Any other suitable approach may be used. For example, a monitoring module may check its ports to determine whether any data streams are coming into the ports. For example, in the case where the device is a video camera, a constant video feed may be communicated from the video camera to the monitoring module. If there is a data stream coming in, then the monitoring module may acknowledge that a device is coupled to that port. FIG. 9C illustrates this method of automatic detection of devices. At step 208 a device may be coupled to the monitoring module. The device may transmit a data stream at step 210. At step 212, the monitoring module may check ports for data streams and may detect a data stream (step 214) at the port corresponding to the device.

In another suitable approach, devices may be configured to periodically, continuously, or upon particular events (e.g., power-up, user pressing a button, or any other suitable event) send a message through their respective connection interfaces, identifying themselves. For example, each device may have a user interface such as a button that a user may need to interact with (e.g., pressing the button) in order for the device to be detected. For example, upon user interaction, the device may send a communication to its corresponding monitoring module. The communication may be any suitable communication that may allow the monitoring module to detect the device. In one suitable embodiment, the communication may include a serial number associated with the device. The serial number may be used by the monitoring module to identify the device in subsequent processes. If desired, this approach may be used with wireless devices (i.e., devices 32 that communicated with monitoring module 28 via a wireless interface such as Bluetooth), while wired devices may be detected using any other suitable method.

Any other suitable approach for the automatic detection of devices may be used. For example, the monitoring module may detect whether electrical current is flowing through device ports as a means of detecting devices (in the case of wired devices). In such an embodiment, the device may change the state of an interface element (e.g., a connection pin) between a high value and a low value depending on whether power is being sent through the port to the device. For example, if a video camera is coupled to the monitoring module, the video camera may be automatically powered by the current from the monitoring module. The flow of current may cause the value of a particular connection pin to change from low to high. The monitoring module may detect the high value of the particular connection pin, thus indicating the presence of a device.

In another suitable approach, the devices and monitoring modules may be configured according to hot-plugging standards (e.g., that make use of IEEE 1394, USB, PCMCIA, or any other interface that accords with hot-plugging standards). Any such suitable approach may be used.

In one suitable embodiment of the present invention, a detected device may communicate a unique string to the monitoring module. The unique string may be used by the monitoring module to detect the device or the unique string may be communicated subsequent to the detection of the device. The unique string may contain a uniform resource identifier (URI), such as, for example, a uniform resource locator (URL). The URI may provide a link to a downloadable object, such as, for example, a remote method invocation (RMI), a common object request broker architecture (CORBA) object, a distributed component object model (DCOM) object, a device driver/device descriptor, or any other suitable downloadable object. The downloadable object may be acquired by monitoring module 28 (using, for example, communication network 16). The downloadable object may be installed at monitoring module 28. The object may be executed and may take responsibility for running the corresponding device, registering parameters, registering events, registering components, or for performing any combination of these or any other suitable functions.

Figure 10:
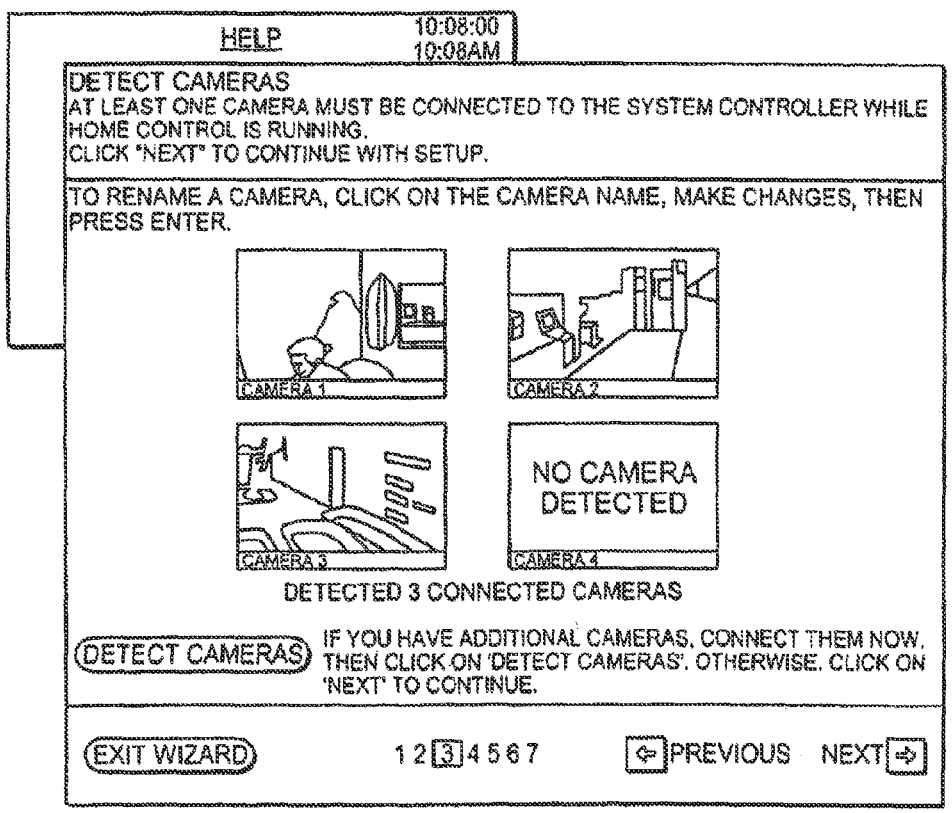
FIG. 10 shows an illustrative registration display screen for notifying the user of detected devices and to allow the user to rename a device in accordance with an embodiment of the present invention.

FIG. 10 shows an illustrative display showing which devices have been detected. The registration process may provide users with opportunities to set up or customize the detected devices in any suitable way. For example, the system may allow the user to rename any device, as in the illustrated example, to set parameters for detected devices (e.g., setting a digital camera's resolution, setting default settings for device, etc.), or to customize the devices in any other suitable way.

Figure 11:
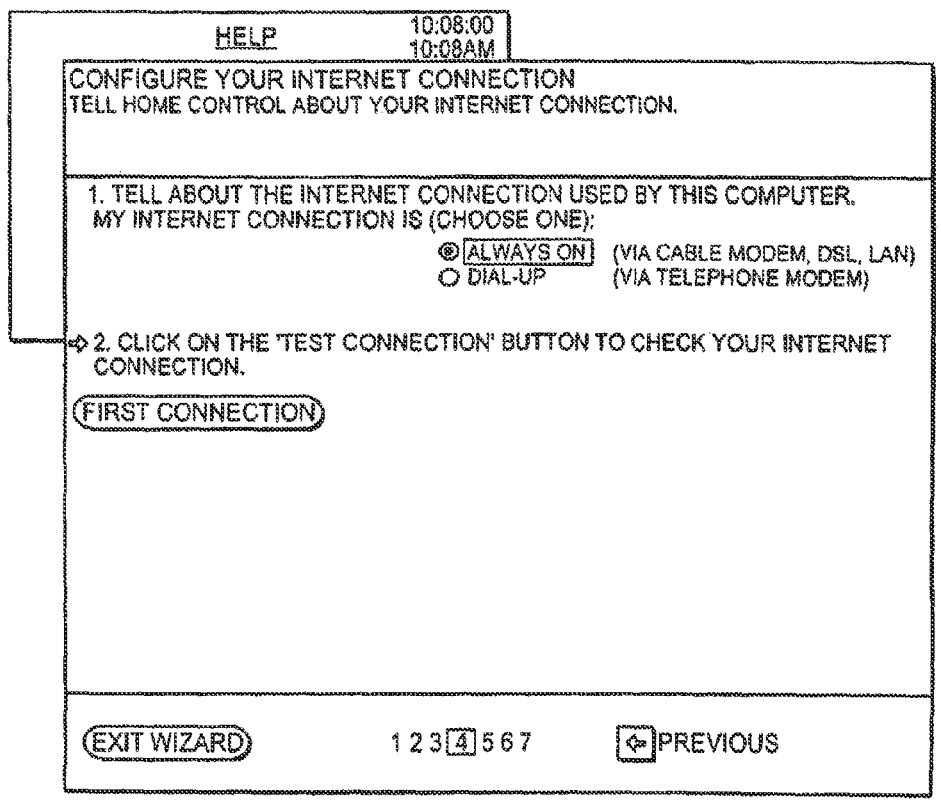
FIG. 11 shows an illustrative registration display screen that allows the user to provide information on the communications network being used and to test the connection in accordance with an embodiment of the present invention.

Other information that monitoring module 28 may supply to remote site 14 during the registration process may include information about the type of communications network 16 being used by the client access device to communicate with remote site 14. FIG. 11 is an illustrative display that may be displayed for the purpose of requesting this information. Any suitable information may be supplied to remote site 14 during the registration process, including, for example, information regarding client device 22, parameters for devices 32, and information regarding any particular software or hardware component of installation 12.

Figure 12:
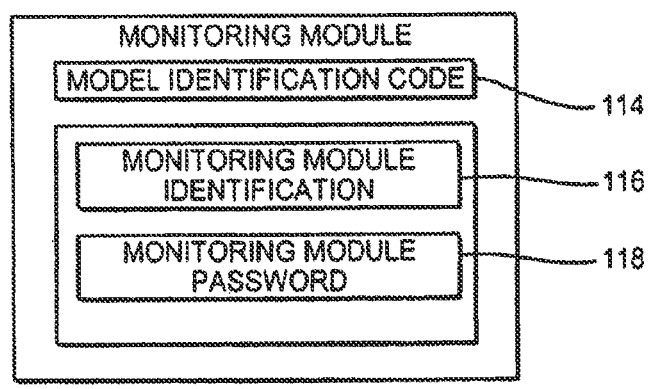
FIG. 12 is a block diagram of an illustrative identification information that may be generated by a monitoring module in accordance with an embodiment of the present invention.

The monitoring module may generate a globally unique monitoring module identification and a monitoring module password during the registration process. These are illustrated in FIG. 12. Every monitoring module 28 may have a model identification code, identifying the particular model of the monitoring module. During the registration procedure, or at any other suitable time, the monitoring module may generate a monitoring module identification 116 and a monitoring module password 118. If desired, the monitoring module identification 116 and a monitoring module password 118 may be predetermined and stored in memory in the monitoring module during the manufacturing process. The monitoring module identification may be unique to each particular monitoring module in the whole set of existing monitoring modules. This is merely an illustrative embodiment of the monitoring module, and any other suitable embodiment may be used.

Monitoring module 28 and remote site 14 may communicate using a communications protocol. The communications protocol between monitoring module 28—and remote site 14 (e.g., via communication network 16) may consist of a series of predefined messages, message parameters, and return codes. The registration protocol may be a subset of this communications protocol and may be specific to the registration process used to register monitoring modules and devices with remote site 14.

Registration protocol messages may be initiated by the monitoring module. The monitoring module may, for example, generate a transaction identification for each message. The transaction identification may be an identifier that is unique within a given time window. Registration protocol messages may include, or be accompanied by, the transaction identification, model identification code, monitoring module identification, and monitoring module password. The registration protocol message may include commands and any required command-specific parameters. If desired, any suitable part of the system other than the monitoring module may initiate the communication of registration protocol messages. For example, the user may manually initiate the registration protocol messages using, for example, client device 22.

Remote site 14 may process monitoring module registration messages and return confirmation messages to the monitoring module that initiated or generated the registration messages. The confirmation message may contain the original message's transaction identification, a version identification of the software being used at web server 46, database server 48, or both, and the name or other identification of the command to which the confirmation is responding. If desired, confirmation messages may include any other identification information or other suitable information instead of or in addition to those described.

Confirmation messages may also include an acknowledge character (ACK) to indicate remote site 14 processed the message correctly. When remote site 14 cannot process the message correctly, for whatever reason (e.g., checksum error, invalid command parameter, etc.), confirmation message may include a negative-acknowledge character (NAK) code. The confirmation message may also include an error message that may indicate the reason for the NAK code.

In one suitable approach, remote site 14 may have the ability to recognize certain errors, forms of errors, or both. Remote site 14 may also correct the recognized errors. Instead of returning a NAK code in this situation, remote site 14 may return an ACK code with a notification of the detected error and the fact that it was corrected. Alternatively, remote site 14 may only return an ACK code without the acknowledgment that an error was corrected. Any such suitable response may be used.

If desired, multiple registration protocol or other messages may be sent using only one communication. This may be accomplished using any suitable technique. For example, the messages may be bundled into an extensible markup language (XML) command schema. Remote site 14 may, likewise, respond to the bundled message communication in one XML confirmation schema. Alternatively, remote site 14 may provide individual responses for each command in the original communication.

Figure 13:
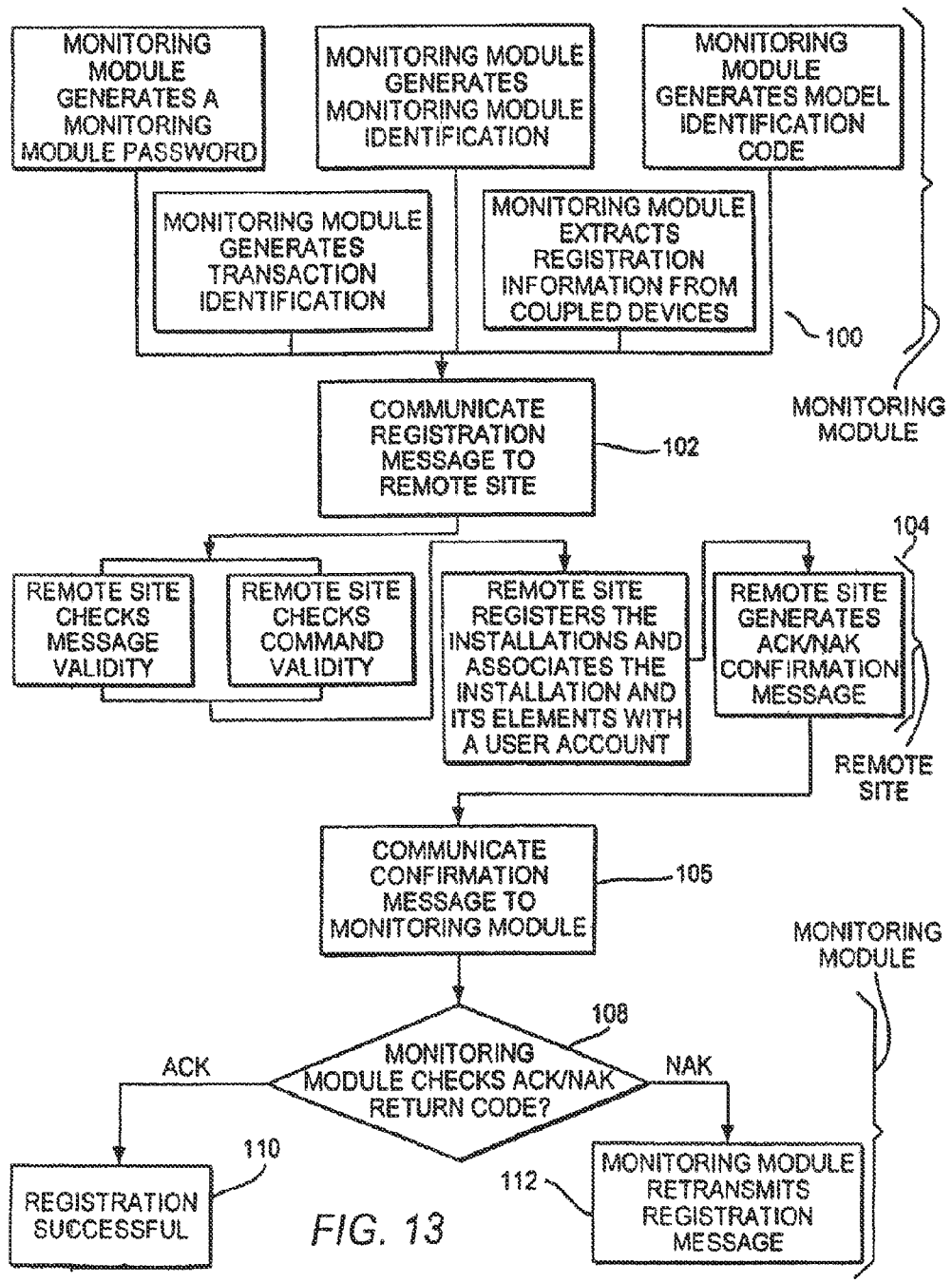
FIG. 13 is a flow chart of illustrative steps involved in the automatic registration of an installation in accordance with an embodiment of the present invention.

FIG. 13 shows illustrative steps involved in the registration process. It should be understood that the steps shown in FIG. 13 may be altered in any suitable way. For example, steps may be added, deleted, or performed in any suitable order. FIG. 13 is merely an illustrative embodiment of the registration process. Any suitable modifications may be made in accordance with the present invention. In the first series of steps 100, the monitoring module may generate a monitoring module identification, a monitoring module password, a model identification code, and a transaction identification. Registration information from devices 32, coupled to the monitoring module may be extracted. These pieces of information may be included in a registration message that is communicated to remote site 14 by monitoring module 28 at step 102.

At step 104, remote site 14 may check the validity of registration messages, of command (or commands) included in the registration messages, or both. Checking message validity may include, for example, checking whether a message has a transaction identification that is unique within the agreed upon time window; checking whether a message includes a unique monitoring module identification and a monitoring module password; and checking whether a message includes a model identification code. If desired, any other suitable technique may be used in checking message validity. Checking message command validity may include, for example, determining whether a command is one that remote site 14 is able to recognize (i.e., is an actual predefined command); and whether a message includes the correct command parameters for the command used. If desired, any other suitable technique may be used in checking message command validity. If desired, remote site 14 may also check for command specific validity. This may involve, among other things, ensuring that any contingent devices have already been registered, checking to make sure a device that is to be registered has not already been registered, and any other suitable validity checks. FIG. 14 shows illustrative commands, corresponding command parameters, and corresponding command validity checks for the registration process. If desired, any other suitable commands may be used.

If there are no errors, remote site 14 may register the installation, including the monitoring module, devices, resources, components, virtual representations, and any other suitable elements of the installation. If desired, any of the elements may also be registered separately from other elements. Remote site 14 may also associate the registered elements with the corresponding user account. Registering monitoring modules 28 and devices 32 may include, for example, adding the identified monitoring module, devices, user, or any other suitable information contained in the registration message, to a database at remote site 14. Remote site 14 may then generate a confirmation message that includes, in the case of no errors, an ACK. When errors are encountered during the registration process, remote site 14 may return a NAK. At step 106, the confirmation message may be transmitted from remote site 14 to the monitoring module. At step 108, the monitoring module checks the confirmation message. If a NAK is found, then the monitoring module may retransmit the registration message at step 112. If an ACK is found then the registration is deemed to be successful at step 110.

Figure 15:
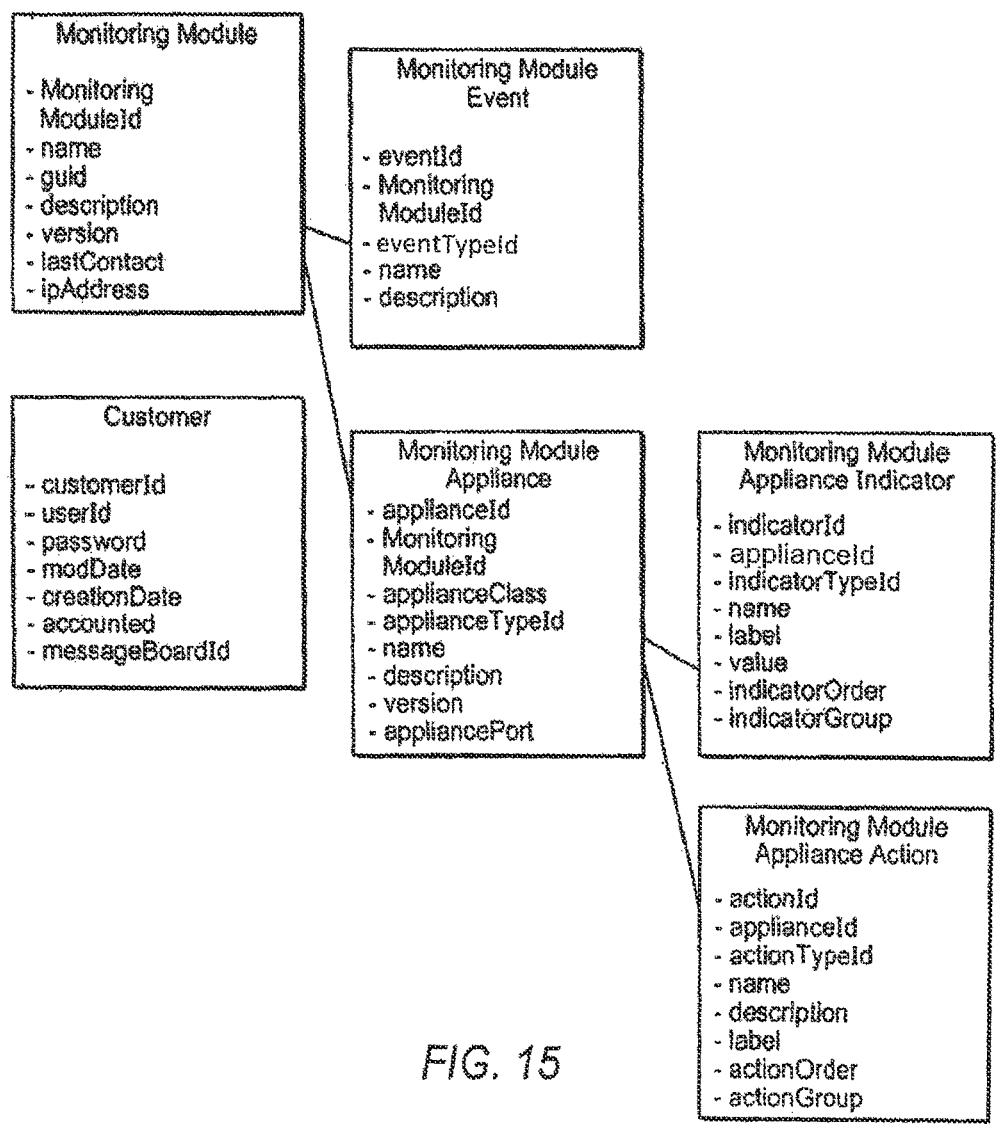
FIG. 15 is an illustrative database schema that may be used by the database server of FIG. 1 in accordance with an embodiment of the present invention.

Information regarding registered monitoring modules and registered devices may be stored in the database. Remote site 14 may access the database to retrieve information about the registered monitoring module (or monitoring modules) and registered devices. The system may provide the user with the ability to set preferences for the registered devices, gather information from the registered devices, and control the registered devices. The database may allow for an efficient mechanism by which information about devices may be accessed and provided to the user. An illustrative database schema is shown in FIG. 15. If desired, any other suitable schema may be used.

When a user registers with remote site 14, a number of table entries in the database may be created. The user's personal information, billing information, the monitoring module's unique monitoring module identification, the monitoring module password, and any other suitable data may be stored in the database. Entry of the data into the database may be facilitated by using an appropriate database application program interface (API), such as, for example; an API with a data parameter that may create a data cell and store the content of the data parameter in the data cell. Thus, only a single function call may be needed for entering a piece of data into the database. Once a new user is added to the database, the function may return a user identification code or number. This user identification may be used by the system to refer to the user rather than having to use the user's name.

The process for adding entries for monitoring modules and devices in the database may be similar to the process for adding entries for users. That is, using APIs, new table entries may be added in the database. When registering new monitoring modules and devices, only a single function may need to be called by web server 46 to create the appropriate table entries in database 58. The appropriate table entries may be created and the appropriate identification codes or numbers may be returned. If desired, any other suitable technique for adding entries for monitoring modules and devices in the database may be used.

When processing validity checks, web server 46 may query the database to determine whether certain entries are already in existence. For example, when registering a new device, a function may be called by web server 46 that returns a boolean value corresponding to whether or not the device already exists in the database. This querying process may be performed using suitable API's.

Although the illustrated system uses APIs as an interface between database server 48 and web server 46, other suitable technologies may be used. For example, Perl scripts, CGI scripts, Cold Fusion, or any other suitable technologies, or combination thereof, may be used to interface database server 48 with web server 46.

Figure 16:
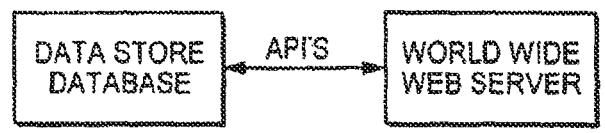
FIG. 16 is a diagram showing an illustrative relationship between the database and the web server in accordance with an embodiment of the present invention.

FIG. 16 illustrates a relationship between web server 46 and the database. Generally, communication between the database and the world wide web site may be done through the use of API functions. The web server may call a particular API function that causes the database to be accessed. The API may then return a value (in accordance with the specification of the particular function) that is sent to the web server. This is merely an illustrative way of allowing the web server to interact with the database. If desired, any other suitable way of allowing the web server to interact with the database may be used.

Figure 17:
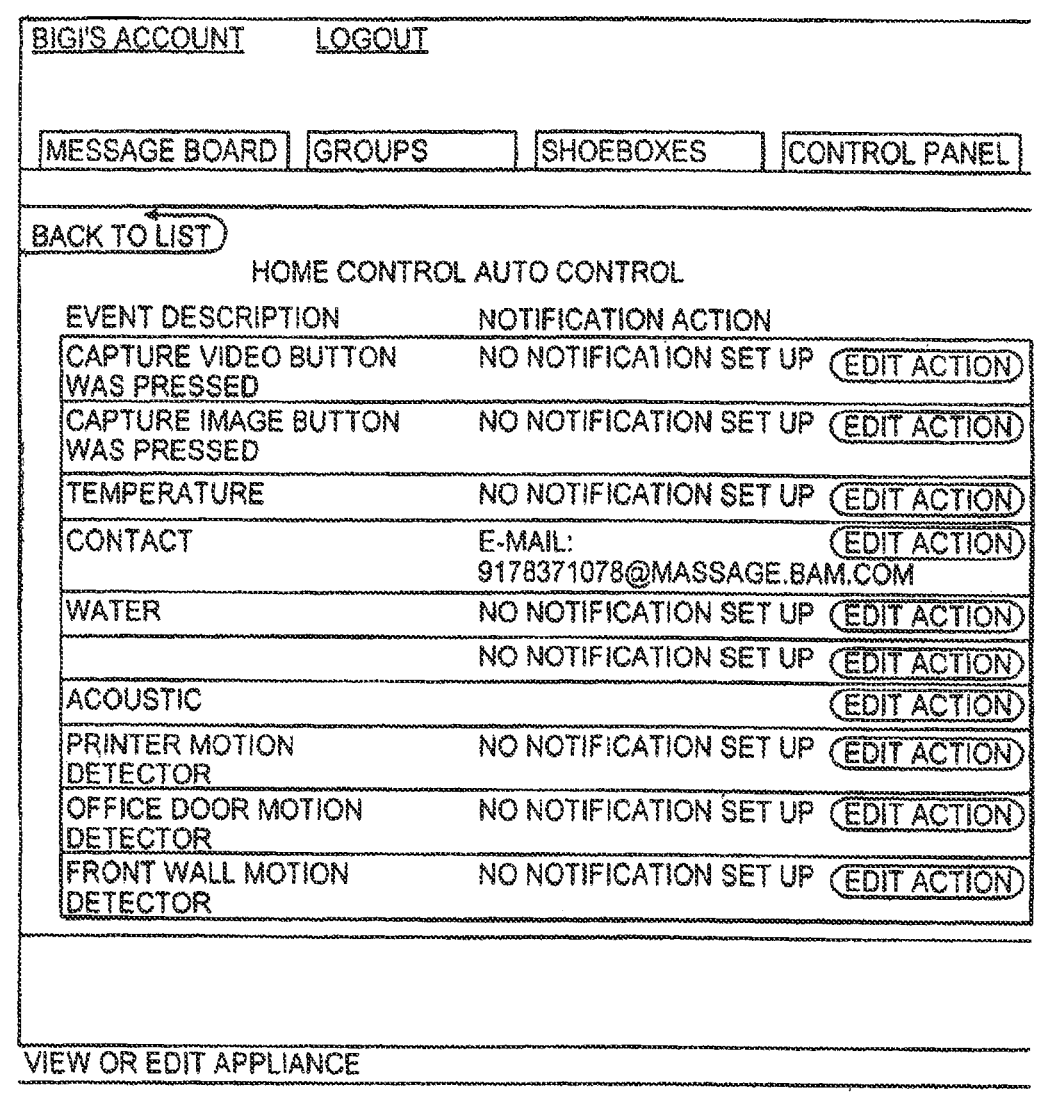

Users may also edit preferences for registered devices. For example, the system may provide users with opportunities to set up special notification preferences for particular devices. FIG. 17 shows an illustrative display. The display shows a listing of event descriptions and the corresponding notifications set up for each event description listing. The user may be given the ability to edit the notification action.

In one suitable embodiment of the present invention, registration of a device 32 may entail the registration of actions and indicators associated with that device. An action may be an action that a user may take with respect to a corresponding device 32 from a remote location using, for example, remote user access device 17. For example, a user accessing a web site using user access device 17 and turning up the brightness level of a video camera at installation 12 may be a suitable action. An indicator may be used to provide information regarding particular feedback from a corresponding device 32. For example, the current frame rate of a video camera may be a suitable indicator.

In another suitable embodiment of the present invention, the registration process may be layered with sub-registration processes for registering users, registering installations associated with their respective users, registering monitoring modules associated with their respective installations (and, in turn, associated with their respective users), registering devices associated with their respective monitoring modules, registering resources associated with their respective devices, registering components associated with their respective resources, and registering virtual representations which are made up of components to provide a virtual device. This is illustrated by step 304 of FIG. 4.

The registration process for each of these layers may include registration information being sent from the monitoring module to the remote site, including suitable registration commands and parameters (e.g., addComponent (Resource, monitoringModule, componentType, etc.)). Registration messages for the different layers may be generated using a markup language (e.g., HTML). For example, HTML form post commands with name/value pairs may be used in the registration message. When the registration message is communicated to the remote site, web server 46 may process the registration message by parsing the markup language code. Appropriate entries may be made into database 58 at remote site 14 to catalog the registered elements of an installation.

Each registered element may be assigned a suitable identification code by remote site 14 that may be used to identify at remote site 14 the element within a particular installation. In one suitable approach, monitoring module 28 may assign an identification to an element of installation 12 that is unique only to installation 12 or to monitoring module 28. The identification assigned by monitoring module 28 may or may not be made identical to the identification code assigned by remote site 14. In the approach where the identifications are different, the identification code assigned by remote site 14 may be mapped to the identification assigned by monitoring module 28 (e.g., using appropriate database constructs). When communicating with monitoring module 28 regarding a particular element, remote site 14 may look up the mapped identification assigned by monitoring module 28 and communicate using that identification. In the case where the remote site 14 and monitoring module 28 use the same identification, the identification assigned by remote site 14 may be returned to monitoring module 28. Monitoring module 28 may use the identification in subsequent communications with remote site 14 when referring to the element of installation 12 with which identification is associated.

Virtual representation registration may involve a template document being registered with the remote site. A template document may be a description of the layout of components (i.e., virtual representations of actual device components) that may be used to generate a web page displaying the components. A markup language, such as, for example, HTML may be used to generate a template document. A template tag may be used that may take the form of <component id=XX>, where "id" may be used to designate a particular component. The tag may be followed with code (e.g., HTML code, Javascript, etc.) that may include state information of the particular component, or any other suitable information. When a user accesses a registered virtual representation (of a registered device) via, for example, web page 47, remote site 14 may collect all of the components associated with the device as well as the template document for the virtual representation of the device. Remote site 14 (e.g., web server 46) may generate a web page that may include a collection of code that was cut and pasted from the template document, producing a virtual representation of the device.

Users that access the virtual representation of the device may make any suitable changes to the individual components (e.g., that correspond to state changes of the corresponding device) and those changes may be communicated to monitoring module 28. In one suitable embodiment, the actual state of components may not be altered in database 58 when the changes are issued by suitable users through, for example, browser 26. Rather, upon monitoring module 28 receiving state changes via, for example, packaged commands from queue 51, the commands may be delivered to an appropriate device descriptor 49. Device descriptor 49 may be responsible for communicating a command to remote site 14 for the purpose of updating database 58 with the respective state changes. The communication from device descriptor 49 may confirm the acceptance of the state changes. Changes in display components of device's virtual representation may signal that a corresponding change is or has been performed in physical device 32.

Figure 18:
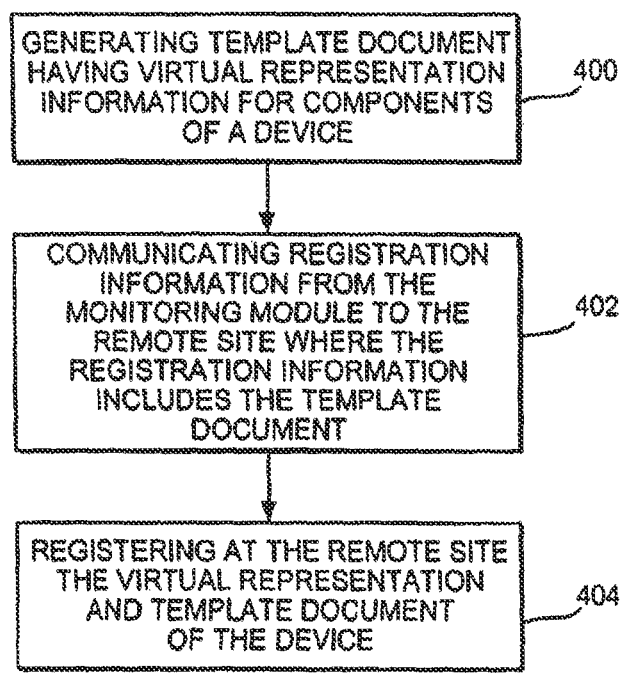
FIG. 18 is a flow chart of illustrative steps involved in registering virtual representation in accordance with an embodiment of the present invention.

FIG. 18 is a flowchart of illustrative steps involved in registering a virtual representation of a device. At step 400 a template document is generated. The template document may be generated at the monitoring module, at the device, or at any other suitable location. The monitoring module may communicate registration information at step 402. The registration information may include registration information for the monitoring module, devices, resources, components, and virtual representations of devices. The registration information may also include the template document that may include information related to components. At step 404, the remote site may use the registration information to register, among other things, the virtual representation of the device, including the template document.

This is merely an illustrative approach of registering a virtual representation. Any other suitable approach may be used. For example, the present invention is not limited to using HTML, but may make use of any suitable markup language or any suitable language, in general, to code registration information. If desired, template documents need not be communicated by monitoring module 28 to remote site 14. Any suitable URI such as, for example, a URL, may be communicated that may direct remote site 14 to a corresponding template document. In another suitable approach, multiple template documents or one or more URIs linked to multiple template documents may be registered in connection with a particular virtual representation. For example, a device's virtual representation may have a main layout for resources, which may each have a template for their respective components.

In one suitable embodiment of the present invention, events may be registered at a remote site. An event may be specific to a particular device. For example, "FIRE!!!" may be a unique event to a fire alarm device, whereas "door motion sensor tripped" may be a unique event to a door motion detector device. Any such suitable events may be associated with their respective suitable devices.

Figure 19:
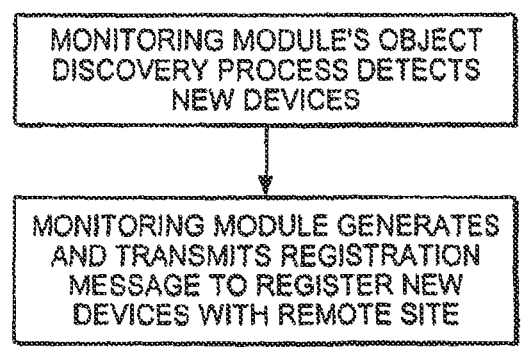
FIG. 19 is a flow chart of illustrative steps involved in the automatic detection and registration of new devices in accordance with an embodiment of the present invention.

In one suitable embodiment of the present invention, as new devices are added to a registered monitoring module, the monitoring module may automatically (i.e., without any user interaction) detect the presence of the new devices and automatically notify remote site 14 of the presence of the new devices. Remote site 14 may, in turn, add the new devices to the database. In order to determine when and which new devices are added, the monitoring module may conduct object discovery on a continuous basis. If desired, the object discovery may be conducted on a periodic basis. Once new devices are found, the monitoring module may send a registration message to remote site 14 in accordance with the present invention. This process is shown in FIG. 19.

In some suitable embodiments of the present invention an installation 12 may be re-registered. For example, in the case where a system crash occurs at an installation 12, or if the hardware, software, or both is upgraded at the installation (or at the remote site), the installation may need to be re-registered Re-registration may be necessary for any suitable reason. The process for re-registration may be substantially similar to the initial registration process for an installation, monitoring modules, resources, components, and virtual representations.

In one suitable approach, remote site 14, remote user access devices 17, or any other suitable remote elements of system 10 may access installation 12 or any of the elements of installation 12 using a special address (e.g., IP address) that is associated with a particular installation 12 or with a particular element of installation 12. The special address may be communicated from the corresponding installation or element of an installation during the registration process.

Thus, systems and methods for the automatic registration of devices are provided. One skilled in the art will appreciate that the present invention can be practiced by other than the described embodiments, which are presented for purposes of illustration and not of limitation, and the present invention is limited only by the claims which follow.

What is claimed is:

1. A system, comprising:
    a remote site being communicatively coupled to a communications networks;
    a node being communicatively coupled to the communications network, the node being communicatively coupled to the remote site via the communications network, the node including:
        a device being disposed at a location remote from the remote site, the device including a sensor for sensing information related to a condition of the location remote from the remote site, the device being identifiable by device identifying information, the device identifying information being associated with a user account maintained by the remote site; and
        interface software serving as an interface between the device and the remote site, the interface software being at least partially located on the device to enable communication between the device and the remote site via the communications network, the interface software transmitting from the device to the remote site the information related to the condition of the location remote from the remote site, the device identifying information being transmitted in association with the information related to the condition of the location remote from the remote site; and
    a client application being configured to run on a client device that is communicatively coupled to the communications network, the client application being communicatively coupled to the remote site via the client device and the communications network, the client application and the client device being remote from the remote site, the client application being associated with the user account maintained by the remote site, the client application being configured to:
        obtain from the remote site, via the client device and the communications network, the information related to the condition of the location remote from the remote site; and
        display, via the client device, a user interface including a virtual component corresponding to the condition of the location remote from the remote server, the virtual component of the user interface indicating to a user the information related to the condition of the location remote from the remote site;
    the remote site being configured to:
        maintain in a data store account information associated with the user account, the account information associated with the user account including:
            the device identifying information of the device disposed at the location remote from the remote site, wherein the device identifying information is received at the remote site during registration of the device at the remote site;
        obtain from the interface software of the device disposed at the location remote from the remote site, via the communications network, the information related to the condition of the location remote from the remote site and the device identifying information of the device;
        store, in the data store, the information related to the condition of the location remote from the remote site, wherein the information related to the condition of the location remote from the remote site is stored in association with the device identifying information of the device, wherein the information related to the condition of the location remote from the remote site is included in the account information associated with the user account; and
        transmit to the client application associated with the user account, via the communications network and the client device, the information related to the condition of the location remote from the remote site, wherein the client application indicates to the user the information related to the condition of the location remote from the remote site via the virtual component that corresponds to the condition of the location of the location remote from the remote site.

2. The system of claim 1, wherein the remote site transmits to the client application the information related to the condition of the location remote from the remote site responsive to receiving from the client application a monitor request for information related to the condition, the monitor request including the device identifying information of the device.

3. The system of claim 2, wherein the interface software of the device disposed at the location remote from the remote site transmits to the remote site the information related to the condition of the location remote from the remote site responsive to receiving from the remote site an information request for information related to the condition, the information request including the device identifying information of the device.

4. The system of claim 2, wherein the remote site transmits the information request to the software interface of the device responsive to receiving the monitor request from the client application.

5. The system of claim 4, wherein the remote site uses the device identifying information included in the monitor request received from the client application to obtain from the data store the address usable for communicating with the device disposed at the location remote from the remote site via the interface software of the node, wherein the remote site transmits the information request to the interface software of the device via the address.

6. The system of claim 1, wherein the device disposed at the location remote from the remote site is a thermostat.

7. The system of claim 6, wherein the condition of the location remote from the remote site is temperature and the information related to the condition is a temperature value sensed by the component of the device.

8. The system of claim 7, wherein the virtual component of the user interface of the client application indicates the information related to the condition by displaying a numerical representation of the temperature value.

9. The system of claim 6, wherein the user interface includes a virtual representation of the thermostat.

10. The system of claim 1, wherein the client device on which the client application runs is a cellular mobile device.

11. The system of claim 1, wherein the client application running on the cellular mobile device and the node are communicatively coupled via a local-area network, wherein the client application is capable of transmitting a command directly to the node via the local-area network.

12. The system of claim 1, wherein the client device on which the client application runs is a system controller, the system controller and the node being disposed at the location remote from the remote site, the system controller being communicatively coupled to the node via a local-area network.

13. The system of claim 1, wherein the device disposed at the location remote from the remote site is a camera, a radio, a smoke or fire detector, a contact sensor, a light switch, an audio device, a video device, a display device, a washer, a dryer, a microwave oven, a cooking range, a car alarm, a plant watering device, a sprinkler, a carbon monoxide detector, a humidistat, or a rain gauge.

14. The system of claim 1, wherein, responsive to a user request to use the user interface to transmit a request for the information related to the condition of the location remote from the remote site, the client application is configured to prompt the user to input the login identifier and password included in the account information of the user account.

15. The system of claim 1, wherein the remote site is further configured to:
transmit an unsolicited command to the device disposed at the location remote from the remote site, wherein the unsolicited command is a command to download a software update, a command to synchronize polling intervals, a command to change a state of the device, or a command to transmit the information related to the condition of the location remote from the remote site.

16. A method, comprising:
responsive to user input received at a user interface being configured to remotely monitoring a device of a node to obtain information related to a condition of a location where the device is disposed, transmitting to a remote site, by a client application running on a client device, a monitor request and device identifying information that identifies the device of the node, the monitor request being a request for the information related to the condition of the location of the device, the device including a sensor for sensing the information related to the condition of the location of the device, the client device being operatively coupled via a communications network to the remote site, the location of the device of the node being remote from the remote site, the node including interface software being communicatively coupled via the communications network to the remote site, the interface software serving as an interface between the device of the node and the remote site, the device of the node being registered to a user account maintained in a data store by the remote site, the user account including the device identifying information that identifies the device of the node, the user interface being displayed by the client application running on the client device, the user interface including a virtual component that corresponds to the condition of the location and that indicates to a user the information that is sensed by the component of the device and that relates to the condition;
responsive to receiving, from the client application running on the client device, the monitor request and the device identifying information that identifies the device of the node, determining, by the remote site, an address usable for communicating with the device of the node via the interface software;
transmitting, from the remote site to the address usable for communicating with the device of the node via the interface software, a request for information related to the condition of the location of the device;
responsive to receiving from the remote site a request for information related to the condition of the location of the device:
instructing, by the interface software of the node, the device to provide the information related to the condition of the location of the device; and
transmitting, by the interface software of the node, to the remote site the information related to the condition of the location of the device;
responsive to receiving from the interface software of the node the information related to the condition of the location of the device, transmitting, by the remote site, to the client application running on the client device the information related to the condition of the location of the device; and
responsive to receiving from the remote site the information related to the condition of the location of the device, indicating to a user, a user interface generated by the client application on the client device, the information related to the condition of the location of the device via the virtual component of the user interface that corresponds to the condition of the location of the device.

17. The method of claim 16, wherein the device of the node is a thermostat, the condition of the location is temperature, the information related to the condition is a temperature value sensed by the component of the device, and the virtual component of the user interface of the client application indicates the information related to the condition by displaying a numerical representation of the temperature value.

18. The system of claim 16, wherein the client device on which the client application runs is a cellular mobile device, wherein the client application running on the cellular mobile device and the node are communicatively coupled via a local-area network, wherein the client application is capable of transmitting a command directly to the node via the local-area network.

19. The system of claim 16, wherein the client device on which the client application runs is a system controller, the system controller and the node being disposed at the location that is remote from the remote site, the system controller being communicatively coupled to the node via a local-area network.

20. The system of claim 1, wherein the device of the node is a camera, a radio, a smoke or fire detector, a contact sensor, a light switch, an audio device, a video device, a display device, a washer, a dryer, a microwave oven, a cooking range, a car alarm, a plant watering device, a sprinkler, a carbon monoxide detector, a humidistat, or a rain gauge.

* * * * *